US012774419B2

(12) United States Patent
Zellhuber et al.

(10) Patent No.: US 12,774,419 B2
(45) Date of Patent: Oct. 27, 2026

(54) METHOD AND SYSTEM FOR STEAMCRACKING

(71) Applicant: LINDE GMBH, Pullach (DE)

(72) Inventors: Mathieu Zellhuber, Martinsried (DE); Michael Horenz, Munich (DE); Tobias Sinn, Munich (DE); Sebastian Mayer, Freising (DE)

(73) Assignee: Linde GmbH, Pullach (DE)

( * ) Notice: Subject to any disclaimer, the term of this patent is extended or adjusted under 35 U.S.C. 154(b) by 524 days.

(21) Appl. No.: 18/548,889

(22) PCT Filed: Mar. 8, 2022

(86) PCT No.: PCT/EP2022/055876
§ 371 (c)(1),
(2) Date: Sep. 1, 2023

(87) PCT Pub. No.: WO2022/189422
PCT Pub. Date: Sep. 15, 2022

(65) Prior Publication Data
US 2024/0158702 A1 May 16, 2024

(30) Foreign Application Priority Data
Mar. 10, 2021 (EP) .................................... 21161749

(51) Int. Cl.
*C10G 9/36* (2006.01)
*B01J 3/04* (2006.01)
*C10G 9/24* (2006.01)

(52) U.S. Cl.
CPC . *C10G 9/36* (2013.01); *B01J 3/04* (2013.01)

(58) Field of Classification Search
CPC ... C10G 9/00; C10G 9/24; C10G 9/34; C10G 9/36; C10G 51/023; B01J 3/04;
(Continued)

(56) References Cited

U.S. PATENT DOCUMENTS 3,426,733 A 2/1969 Von Wiesenthal
4,107,226 A 8/1978 Ennis, Jr. et al.
(Continued)

FOREIGN PATENT DOCUMENTS

CN 1358222 A 7/2002
CN 106164222 A 11/2016
(Continued)

OTHER PUBLICATIONS

Sinatra et al., "Polimeri Europa Olefin Plant Maximizes Benefits from Advanced Solutions," 2003 AlChE Spring National Meeting, Apr. 2, 2003, pp. 1-29.
(Continued)

*Primary Examiner* — In Suk C Bullock
*Assistant Examiner* — Jason Y Chong
(74) *Attorney, Agent, or Firm* — Avek IP, LLC

(57) ABSTRACT

A method of steam cracking using a steam cracking system includes a first steam cracking furnace unit or a plurality of first steam cracking furnace units and a second steam cracking furnace unit or a plurality of second steam cracking furnace units. The first steam cracking furnace unit or each of the plurality of first steam cracking furnace units comprises one or more fired steam cracking furnaces. The second steam cracking furnace unit or each of the plurality of second steam cracking furnace units comprises one or more electric steam cracking furnaces. The first steam cracking furnace unit or each of the plurality of first steam cracking furnace units further includes means for preheating at least a part of combustion air provided to its fired steam cracking furnace or furnaces to a temperature level of at least 100° C.

20 Claims, 19 Drawing Sheets

(58) Field of Classification Search
CPC ........ Y02E 60/36; Y02P 20/129; F01K 13/02; F22B 1/18
See application file for complete search history.

(56) References Cited

U.S. PATENT DOCUMENTS

| | | | |
|---|---|---|---|
| 4,321,130 | A | 3/1982 | Bacsik |
| 4,617,109 | A | 10/1986 | Wells et al. |
| 4,912,282 | A | 3/1990 | Klaus |
| 9,989,305 | B2 | 6/2018 | Mak |
| 2003/0175642 | A1 | 9/2003 | Stephens et al. |
| 2006/0116543 | A1 | 6/2006 | Bellet et al. |
| 2014/0212823 | A1 | 7/2014 | Novak et al. |
| 2016/0097002 | A1 | 4/2016 | Sundaram |
| 2017/0022429 | A1 | 1/2017 | Van Willigenburg |
| 2020/0172814 | A1 | 6/2020 | Oud |
| 2020/0290939 | A1 | 9/2020 | Willigenburg |
| 2021/0171836 | A1 | 6/2021 | Purola |
| 2022/0395805 | A1 | 12/2022 | Mortensen |
| 2023/0407186 | A1 | 12/2023 | Sundaram et al. |
| 2024/0158700 | A1 | 5/2024 | Zellhuber et al. |
| 2024/0158701 | A1 | 5/2024 | Horenz et al. |
| 2024/0158702 | A1 | 5/2024 | Zellhuber et al. |
| 2024/0239728 | A1 | 7/2024 | Keller et al. |
| 2025/0026986 | A1 | 1/2025 | Zellhuber et al. |

FOREIGN PATENT DOCUMENTS

| | | | | | |
|---|---|---|---|---|---|
| CN | 109844068 | A | | 6/2019 | |
| CN | 111944556 | A | | 11/2020 | |
| CN | 112368235 | A | | 2/2021 | |
| DE | 710185 | C | | 9/1941 | |
| DE | 1615278 | A1 | | 7/1970 | |
| DE | 2362628 | A1 | | 6/1975 | |
| DE | 3334334 | A1 | | 4/1985 | |
| DE | 4128180 | A1 | | 2/1993 | |
| DE | 102004020223 | A1 | | 11/2005 | |
| EP | 0229939 | A1 | | 7/1987 | |
| EP | 0229939 | B1 | | 7/1987 | |
| EP | 3075704 | A1 | | 10/2016 | |
| EP | 3249027 | A1 | | 11/2017 | |
| EP | 3249028 | A1 | | 11/2017 | |
| EP | 3415587 | A1 | | 12/2018 | |
| EP | 3725865 | A1 | * | 10/2020 | ............... C10G 9/24 |
| EP | 3730592 | A1 | | 10/2020 | |
| EP | 3748138 | A1 | | 12/2020 | |
| WO | 2005113713 | A2 | | 12/2005 | |
| WO | 2013178446 | A1 | | 12/2013 | |
| WO | 2014090914 | A1 | | 6/2014 | |
| WO | 2015197181 | A1 | | 12/2015 | |
| WO | 2018020399 | A1 | | 2/2018 | |
| WO | 2018065919 | A1 | | 4/2018 | |
| WO | 2018229267 | A1 | | 12/2018 | |
| WO | 2020035575 | A1 | | 2/2020 | |
| WO | 2020150244 | A1 | | 7/2020 | |
| WO | 2020150248 | A1 | | 7/2020 | |
| WO | 2020150249 | A1 | | 7/2020 | |
| WO | 2021052642 | A1 | | 3/2021 | |
| WO | 2022189423 | A1 | | 9/2022 | |

OTHER PUBLICATIONS

Office Action and Search Report issued Oct. 21, 2025 in Chinese Application No. 202280034298.0, 6 pages.
International Search Report and Written Opinion issued in related App. No. PCT/EP2022/055876, mailed Jun. 7, 2022.
Office Action issued Mar. 27, 2026 in Chinese patent application No. 202280020029.9.

* cited by examiner

METHOD AND SYSTEM FOR STEAMCRACKING

CROSS-REFERENCE TO RELATED APPLICATIONS

This application is the national phase of, and claims priority to, International Application No. PCT/EP2022/055876, filed Mar. 8, 2022, which claims priority to European Application No. EP 21161749.3, filed Mar. 10, 2021.

FIELD OF THE INVENTION

The invention relates to a method and a system for steam cracking.

BACKGROUND

The invention is based on the steam cracking technology for the production of olefins and other base chemicals, as e.g. described in the article "Ethylene" in Ullmann's Encyclopedia of Industrial Chemistry, online publication 15 Apr. 2009, DOI: 10.1002/14356007.a10_045.pub2.

Presently, the thermal energy required for initiating and maintaining the endothermic cracking reactions in steam cracking is provided by the combustion of fuel gas in a refractory furnace. The process gas initially containing steam and the hydrocarbons to be cracked is passed through so-called cracking coils placed inside the refractory box, also called radiant zone or section. On this flow path the process gas is continuously heated, enabling the desired cracking reactions to take place inside the cracking coils, and thus the process gas is continuously enriched in the cracking products. Typical inlet temperatures for the process gas into the cracking coils are between 550 and 750° C., outlet temperatures are typically in the range between 800 and 900° C.

In addition to the radiant zone, fired cracking furnaces comprise a so-called convection zone or section and a so-called quench zone or section. The convection zone is usually positioned above the radiant zone and composed of various tube bundles traversing the flue gas duct from the radiant zone. Its main function is to recover as much energy as possible from the hot flue gas leaving the radiant zone. Indeed, only 35 to 50% of the total firing duty is typically transferred within the radiant zone to the process gas passed through the cracking coils. The convection zone therefore plays a central role in the energy management in steam cracking, as it is responsible for the beneficial usage of approximately 40 to 60% of the heat input into a furnace (i.e. of the firing duty). Indeed, when taking the radiant and convection zone together, modern steam cracking plants make use of 90 to 95% of the overall fired duty (based on the fuel's lower heating value or net calorific value). In the convection section, the flue gas is cooled down to temperature levels between 60 and 140° C. before leaving the convection section and being released to the atmosphere via stack.

The flue gas heat recovered in the convection zone is typically used for process duties such as preheating of boiler feed water and/or hydrocarbon feeds, (partial) vaporization of liquid hydrocarbon feeds (with or without prior process steam injection), and superheating of process steam and high-pressure steam.

The quench zone is positioned downstream of the radiant zone along the main process gas route. It is composed of one or more heat exchanger units, having the main functions of quickly cooling the process gas below a maximum temperature level to stop the cracking reactions, to further cool down the process gas for downstream treatment, and to effectively recover sensible heat from the process gas for further energetic usage. In addition, further cooling or quenching can be effected via injection of liquids, e.g. by oil quench cooling when steam cracking liquid feeds.

The process gas heat recovered in the quench section is typically used for vaporizing high-pressure (HP) or super-high-pressure (SHP) boiler feed water (typical at a pressure range between 30 and 130 bar absolute pressure), and for preheating the same boiler feed water, before it being fed to a steam drum. Saturated high-pressure or super-high-pressure steam generated accordingly may be superheated in the convection zone (see above) to form superheated high-pressure or super-high-pressure steam, and from there may be distributed to the central steam system of the plant, providing heat and power for heat exchangers and steam turbines or other rotating equipment. The typical degree of steam superheating achieved in furnace convection zones lies between 150 and 250 K above the saturation temperature (dew point margin). Generally, steam cracking furnaces may operate with high-pressure steam (typically at 30 to 60 bar) or with super-high-pressure-steam (typically at 60 to 130 bar). For the sake of clarity in the description of the invention, high-pressure-steam will be used for the entire pressure range between 30 and 130 bar, but also beyond this upper limit, since the invention includes usage of steam at pressures of up to 175 bar.

An important part of the process gas treatment subsequent to quench cooling is compression which is typically performed after further treatment such as the removal of heavy hydrocarbons and process water, in order to condition the process gas for separation. This compression, also called process or cracked gas compression, is typically performed with multistage compressors driven by steam turbines. In the steam turbines, steam at a suitable pressure from the central steam system of the plant mentioned, and thus comprising steam produced using heat from the convection section and from quench cooling, can be used. Typically, in a steam cracking plant of the prior art, heat of the flue gas (in the convection zone) and heat of the process gas (in the quench zone) is well balanced with the heat demand for producing a large part of the steam amounts needed for heating and driving steam turbines. In other words, waste heat may be more or less fully utilized for generating steam which is needed in the plant. Additional heat for steam generation may be provided in a (fired) steam boiler.

For reference, and to further illustrate the background of the invention, a conventional fired steam cracking arrangement is illustrated in FIG. 1 in a highly simplified, schematic partial representation and is designated 900.

The steam cracking arrangement 900 illustrated in FIG. 1 comprises, as illustrated with a reinforced line, one or more cracking furnaces 90. For conciseness only, "one" cracking furnace 90 is referred to in the following, while typical steam cracking arrangements 900 may comprise a plurality of cracking furnaces 90 which can be operated under the same or different conditions. Furthermore, cracking furnaces 90 may comprise one or more of the components explained below.

The cracking furnace 90 comprises a radiant zone 91 and a convection zone 92. In other embodiments than the one shown in FIG. 1, also several radiant zones 91 may be associated with a single convection zone 92, etc.

In the example illustrated, several heat exchangers 921 to 925 are arranged in the convection zone 92, either in the arrangement or sequence shown or in a different arrangement or sequence. These heat exchangers 921 to 925 are typically provided in the form of tube bundles passing through the convection zone 92 and are positioned in the flue gas stream from the radiant zone 91.

In the example illustrated, the radiant zone 91 is heated by means of a plurality of burners 911 arranged on the floor and wall sides of a refractory forming the radiant zone 91, which are only partially designated. In other embodiments, the burners 911 may also be provided solely at the wall sides or solely at the floor side. The latter may preferentially be the case e.g. when pure hydrogen is used for firing.

In the example illustrated, a gaseous or liquid feed stream 901 containing hydrocarbons is provided to the steam cracking arrangement 900. It is also possible to use several feed streams 901 in the manner shown or in a different manner. The feed stream 901 is preheated in the heat exchanger 921 in the convection zone 92.

In addition, a boiler feed water stream 902 is passed through the convection zone 92 or, more precisely, the heat exchanger 922, where it is preheated. The boiler feed water stream 902 is thereafter introduced into a steam drum 93. In the heat exchanger 923 in the convection zone 92, a process steam stream 903, which is typically provided from a process steam generation system located outside the furnace system of the steam cracking arrangement 900, is further heated and, in the example illustrated in FIG. 1, thereafter combined with the feed stream 901.

A stream 904 of feed and steam formed accordingly is passed through a further heat exchanger 925 in the convection zone 92 and is thereafter passed through the radiant zone 91 in typically several cracking coils 912 to form a cracked gas stream 905. The illustration in FIG. 1 is highly simplified. Typically, a corresponding stream 904 is evenly distributed over a number of cracking coils 912 and a cracked gas formed therein is collected to form the cracked gas stream 905.

As further illustrated in FIG. 1, a steam stream 906 can be withdrawn from the steam drum 93 and can be (over)heated in a further heat exchanger 924 in the convection zone 92, generating a high-pressure steam stream 907. The high-pressure steam stream 907 can be used in the steam cracking arrangement 900 at any suitable location and for any suitable purpose as not specifically illustrated.

The cracked gas stream 905 from the radiant zone 12 or the cracking coils 912 is passed via one or more transfer lines to a quench exchanger 94 where it is rapidly cooled for the reasons mentioned. The quench exchanger 94 illustrated here represents a primary quench (heat) exchanger. In addition to such a primary quench exchanger 94, further quench exchangers may also be present.

The cooled cracked gas stream 907 is passed to further process units 95 which are shown here only very schematically. These further process units 95 can, in particular, be process units for scrubbing, compression and fractionation of the cracked gas, and a compressor arrangement including a steam turbine, which may be operated using steam from the steam drum 93, being indicated with 96.

In the example shown, the quench exchanger 94 is operated with a water stream 908 from the steam drum 93. A steam stream 909 formed in the quench exchanger 94 is returned to the steam drum 93.

SUMMARY

Ongoing efforts to reduce at least local carbon dioxide emissions of industrial processes also extend to the operation of steam cracking plants. As in all fields of technology, a reduction of local carbon dioxide emissions may particularly be effected by electrification of a part of or all possible process units.

As described in EP 3 075 704 A1 in connection with a reformer furnace, a voltage source may be used in addition to a burner, the voltage source being connected to the reactor tubes in such a manner that an electric current generated thereby heats the feedstock. Steam cracking plants in which electrically heated steam cracking furnaces are used were proposed for example in WO 2020/150244 A1, WO 2020/150248 A1 and WO 2020/150249 A1. Electric furnace technology in other or broader contexts is for example disclosed in WO 2020/035575 A1, WO 2015/197181 A1, EP 3 249 028 A1, EP 3 249 027 A1 and WO 2014/090914 A1, or in older documents such as for example DE 23 62 628 A1, DE 1 615 278 A1, DE 710 185 C and DE 33 34 334 A1. WO 2018/020399 A1 discloses a process for cracking a hydrocarbon stream by: combusting fuel in a gas turbine in the presence of compressed air to produce a flue gas, wherein the flue gas drives a turbine to produce electricity in a coupled generator or work to power a coupled rotating equipment; (a) feeding a first portion of the flue gas to a heat exchanger; (b) feeding ambient air to the heat exchanger to be heated by the first portion of the flue gas to provide heated air; (c) feeding a furnace with fuel and a mixture of a second portion of the flue gas and the heated air obtained by step (c) and (d) cracking the hydrocarbon stream in the furnace.

According to U.S. Pat. No. 4,617,109 A, combustion air for steam cracking furnaces is preheated by indirect heat exchange with medium pressure and low pressure steam that has been expanded through steam turbines from high pressure steam produced in the hot section of an ethylene production plant.

Completely or partly modifying the heating concept of a steam cracking plant, i.e. using heat generated by electric energy completely or partly instead of heat generated by burning a fuel, is a rather substantial intervention. As an alternative, less invasive redesign options are often desired, particularly when retrofitting existing plants. These may for example include substituting a steam turbine used for driving the process gas compressor or a different compressor at least partly by an electric drive. While, as mentioned, such a steam turbine may be partly operated with steam generated by waste heat recovered in the convection section of the cracking furnaces, fired steam boilers must typically be provided additionally to supply sufficient steam quantities. Therefore, substituting a steam turbine used for driving the compressors mentioned at least partly by an electric drive may be suitable to reduce or avoid fired boiler duty and thereby to reduce local carbon dioxide emissions.

As further explained below, however, particularly an electrification of parts of such plants has a significant influence on the heat balance of the overall plant. That is, if steam turbines for driving compressors are substituted by electric drives, the waste heat generated in the plant, which was previously used for driving the steam turbines, cannot be fully utilized anymore. On the other hand, if fired furnaces are substituted by electric furnaces, no waste heat from flue gases, which was previously used for providing steam, heating feeds, etc. is not available anymore.

In other words, substituting any carbon dioxide emitting parts of a steam cracking parts has a massive influence on the overall plant operation and is not simply a matter of exchanging one component against another. An efficient and effective integration of such components into a steam cracking plant is therefore of paramount importance for the overall plant design, in particular regarding energy management.

The invention relates, in this connection, particularly to a situation wherein fired steam cracking furnaces are in part substituted by electrically heated steam cracking furnaces or electrically heated steam cracking furnaces are provided in addition to fired steam cracking furnaces, resulting in substantially less or no steam to be produced and to be available from the electrically heated furnaces for steam consumers such as steam turbines or other rotating equipment. In the context of the invention, furthermore, pumps, compressors or other rotating equipment may at least be partly driven by electric energy instead of using steam turbines. The invention particularly relates to a situation wherein a "full electrification" of a steam cracking plant is realized only in part, i.e. for the electrically fired furnaces, while other furnaces are only "partially electrified" using electrically driven rotating equipment. In such situations, as mentioned, an adapted mode of operation must be found as the conventionally well-balanced steam production and consumption situation is almost completely changed for the fully electrified parts, but the conventionally well-balanced steam production and consumption situation gets imbalanced in the partially electrified parts as well.

According to one embodiment, a method of steam cracking includes using a steam cracking system. The steam cracking system has a first steam cracking furnace unit or a plurality of first steam cracking furnace units and a second steam cracking furnace unit or a plurality second steam cracking furnace units. The first steam cracking furnace unit, or each of the plurality of first steam cracking furnace units, includes one or more fired steam cracking furnaces and means for preheating at least a part of combustion air provided to its fired steam cracking furnace or furnaces to a temperature level of at least 100° C. The second steam cracking furnace unit, or each of the plurality of second steam cracking furnace units, includes one or more electric steam cracking furnaces.

According to another embodiment, a system for performing a method of steam cracking has a first steam cracking furnace unit or a plurality of first steam cracking furnace units and a second steam cracking furnace unit or a plurality second steam cracking furnace units. The first steam cracking furnace unit, or each of the plurality of first steam cracking furnace units, includes one or more fired steam cracking furnaces and means for preheating at least a part of combustion air provided to its fired steam cracking furnace or furnaces to a temperature level of at least 100° C. The second steam cracking furnace unit, or each of the plurality of second steam cracking furnace units, includes one or more electric steam cracking furnaces.

DETAILED DESCRIPTION

Figure 1:
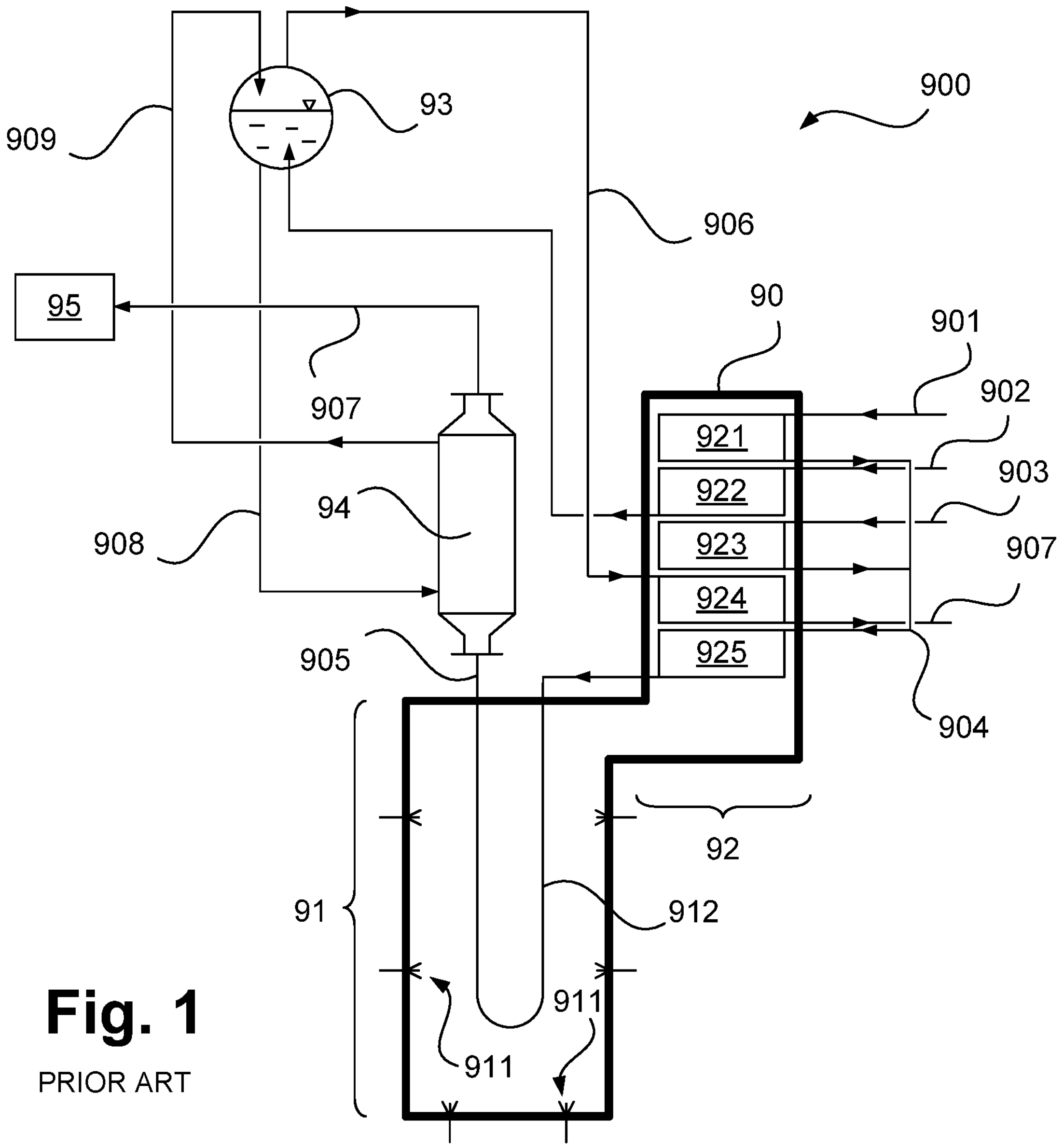
Fig. 1 PRIOR ART
FIG. 1 illustrates a prior art embodiment not forming part of the invention.

Before further describing the features and advantages of the invention, some terms used in the description thereof will be further explained.

The term "process steam" shall refer to steam that is added to a hydrocarbon feed before the hydrocarbon feed is subjected to steam cracking. In other terminology, the process steam is a part of a corresponding feed. Process steam therefore takes part in the steam cracking reactions as generally known. Process steam may particularly include steam generated from the vaporization of "process water", i.e. water which was previously separated from a mixed hydrocarbon/water stream, e.g. from the process gas withdrawn from steam cracking furnaces or from a fraction thereof, particularly by gravity separation in vessels/coalescers, deoxygenation units, or using filters.

The "process gas" is the gas mixture passed through a steam cracking furnace and thereafter subjected to processing steps such as quenching, compression, cooling and separation. The process gas, when supplied to the steam cracking furnace, comprises steam and the educt hydrocarbons subjected to steam cracking, i.e. also the "feed stream" submitted to steam cracking is, herein, also referred to as process gas. If a differentiation is needed, this is indicated by language such as "process gas introduced into a steam cracking furnace" and "process gas effluent" or similar. When leaving the steam cracking furnace, the process gas is enriched in the cracking products and is particularly depleted in the educt hydrocarbons. During the subsequent processing steps, the composition of the process gas may further change, e.g. due to fractions being separated therefrom.

The term "high-purity steam" shall, in contrast to process steam, refer to steam generated from the vaporization of purified boiler feed water. High purity steam is typically specified by standards customary in the field, such as VGB-S-010-T-00 or similar. It typically does not include steam generated from process water, as the latter typically contains some further components from the process gas.

The term "feed hydrocarbons" shall refer to at least one hydrocarbon which is subjected to steam cracking in a steam cracking furnace in a process gas. Where the term "gas feed" is used, the feed hydrocarbons predominantly or exclusively comprise hydrocarbons with two to four carbon atoms per molecule. In contrast, the term "liquid feed" shall refer to feed hydrocarbons which predominantly or exclusively comprise hydrocarbons with four to 40 carbon atoms per molecule, "heavy feed" being at the upper end of this range.

The term "electric furnace" may generally be used for a steam cracking furnace in which the heat required to heat the process gas in the cracking coils is predominantly or exclusively provided by electricity. Such a furnace may include one or more electric heater devices that are connected to an electric power supply system, either via wired connections and/or via inductive power transmission. Inside the heater device material, the applied electric current is generating a volumetric heat source by Joule heating. If the cracking coil itself is used as electric heating device, the released heat is directly transferred to the process gas by convective-conductive heat transfer. If separate electric heating devices are used, the heat released by Joule heating is indirectly transferred from the heating device to the process gas, first from the heating device to the cracking coils preferably via radiation and, to a minor extent, via convection, and then from the cracking coils to the process gas by convective-conductive heat transfer. The process gas may be preheated in various ways before being supplied to the cracking furnace.

A "fired furnace" is, in contrast, generally a steam cracking furnace in which the heat required to heat the process gas in the cracking coils is predominantly or exclusively provided by firing a fuel using one or more burners. The process gas may be preheated in various ways before being supplied to the cracking furnace.

The term "hybrid heating concept" may generally be used when, in steam cracking, a combination of electric furnaces and fired furnaces is used. In the context of the present invention, it is preferably foreseen that a single cracking coil is strictly attributed to a fired or to an electric furnace, i.e. each cracking coil is either exclusively heated by electric energy or exclusively by firing.

The term "predominantly" may, herein, refer to a proportion or a content of at least 50%, 60%, 70%, 80%, 90% or 95%.

The term "rotating equipment", as used herein, may relate to one or more components selected from a compressor, a blower, a pump and a generator, such rotating equipment drivable by a source of mechanical energy such as an electric motor, a steam turbine or a gas turbine.

A "multi-stream heat exchanger" is a heat exchanger in which particularly the medium to be cooled is passed through a plurality of passages such as in a "transfer line exchanger" as e.g. mentioned in the Ullmann article mentioned at the outset.

To the knowledge of the inventors, there has been no description of a dedicated optimization of steamcracker plants (also referred to as "steamcracking arrangements" or "systems" hereinbelow) which do not only contain fired furnaces but also electric furnaces, i.e. "hybrid" plants in the understanding expressed above. The existing literature on electrically heated cracking furnaces is limited to the design and operation of the electric coil heating section itself. There is little information available regarding integration concepts into full furnace architectures (including preheating and quench sections), nor into wider cracker plant architectures in which also fired furnaces are present. This is valid with exceptions to the most recent publications mentioned above, i.e. WO 2020/150244 A1, WO 2020/150248 A1 and WO 2020/150249 A1, but also these publications do not provide a solution adapted for operating electric furnaces together with fired furnaces.

The invention described herein therefore provides, for the first time, concepts allowing for balancing and distributing heat quantities in a low- to zero-emission steamcracker featuring electric furnaces besides fired furnaces. Concepts and solutions provided according to the invention allow for designing a plant architecture and furnace systems that fulfil the following duties or requirements:

Heat a premixed hydrocarbon/steam in a fired or electrically heated cracking coil or furnace from inlet temperatures between 550 and 750° C. to outlet temperatures between 800 and 900° C.

Preheat and, in case of liquid feeds, vaporize hydrocarbon feed streams from typical supply temperatures between 20 and 150° C. to the above mentioned coil inlet temperatures between 550 and 750° C. The preheating and vaporization of the hydrocarbon feed stream is to be made with or without previous addition of process steam, typically supplied to the furnace system at a temperature level between 130 and 200° C.

Effectively and very rapidly cool down the process gas downstream of the cracking coil to temperature levels of 300 to 450° C. (liquid feedstocks) or 150 to 300° C. (gaseous feedstocks) in one or more multi-stream heat exchangers allowing for heat recovery from the process gas.

Balance energy flows between electrical and fired furnaces as well as between the furnace system and remaining steamcracker plant to ensure safe, reliable and efficient plant operation.

While prior publications may indicate that heat from the process gas stream can be recovered and utilized, e.g. for feed preheating or process steam generation, there is no solution provided how to supply usable process heat to the wealth of other process heat consumers in a steamcracker plant and adjacent chemical complex. While there might be suggestions to not use steam any longer as the primary energy carrier, the mentioned heat supply question is left unanswered, unless one uses electricity for all heating duties in the plant. The latter, rather trivial solution is far from the energetic optimum, because using electricity for heating purposes at low temperatures leads to significant exergy losses. In other embodiments of the prior art, steam generated is strongly superheated, with the intent of electricity generation in a steam turbine combined with a generator system. This is also a questionable solution, since generating electricity from steam originally produced in an electrically heated reactor system again leads to very high exergy losses and non-optimal resource management.

As the electric cracking furnaces, which are used according to the invention in addition to fired furnaces, do not feature a convection zone, suitable steam for driving steam turbines is produced to a smaller extent or not at all. Therefore, according to the invention, steam turbines for the recovery of mechanical energy needed for driving the main gas compressors in the separation section of the plant, or for generating electrical power, may at least in part be substituted by electric drives. Such a solution is preferred according to the invention, which therefore allows for an even more effective operation of corresponding plants. According to the invention, fully electrified large compressor and pump drives are preferably associated to the said combination of electric and fired furnaces, which continue to provide high-purity steam to other process units, but preferably including a modification of the steam conditions to account for a largely predominant heat (instead of power) utilization of said high-purity steam, as indicated below.

The invention proposes new process solutions in terms of furnace and overall plant design and operation for the setup described, i.e. a setup in which electric furnaces are provided in addition to fired furnaces. In simple words, the invention provides a solution to the following questions: "How can an integrated operating concept be realized in a hybrid steam cracking plant mixing electric and fired furnaces, wherein that steam producers as well as steam consumers are at least in part modified? How can heat quantities be balanced or distributed in such a low- to zero-emission hybrid steamcracker system?" As mentioned, substituting of any potentially carbon dioxide emitting parts of a steam cracking parts has a strong influence on the overall plant operation and is not a matter of exchanging one component against another.

Using the two furnace types according to the invention means using two different primary energy sources for the furnaces (electricity or fuel gas), with the one (fuel gas) being easier to store than the other one (electricity). Therefore, a central, common point to all employed furnace subsystems is the ability to vary the primary energy demand of a furnace, while keeping the chemical production rate constant (i.e. a constant total heat duty absorbed by the process in preheaters and coils for constant feed flow and composition). The variation can be done by various means, e.g. by changing set points of stream characteristics (temperature, pressure, flow), by (partially) opening/closing bypass lines, by varying equipment-specific process parameters (heat duty, operating pressure) or other changes in process parameters.

In addition to energy balancing for constant production in each furnace, the invention permits larger variations by further shifting or modifying the chemical production rates within the furnaces. With the variable steam production and inherent thermal energy storage in the steam system, the invention leads to maximum operational flexibility to fit relevant requirements from inside and outside the steamcracker plant. Such requirements may for example be to temporarily minimize electricity import due to unavailability of renewable power, or to maximize heat delivery to facilitate the steam-supplied start-up of an adjacent plant or process unit.

Figure 2:
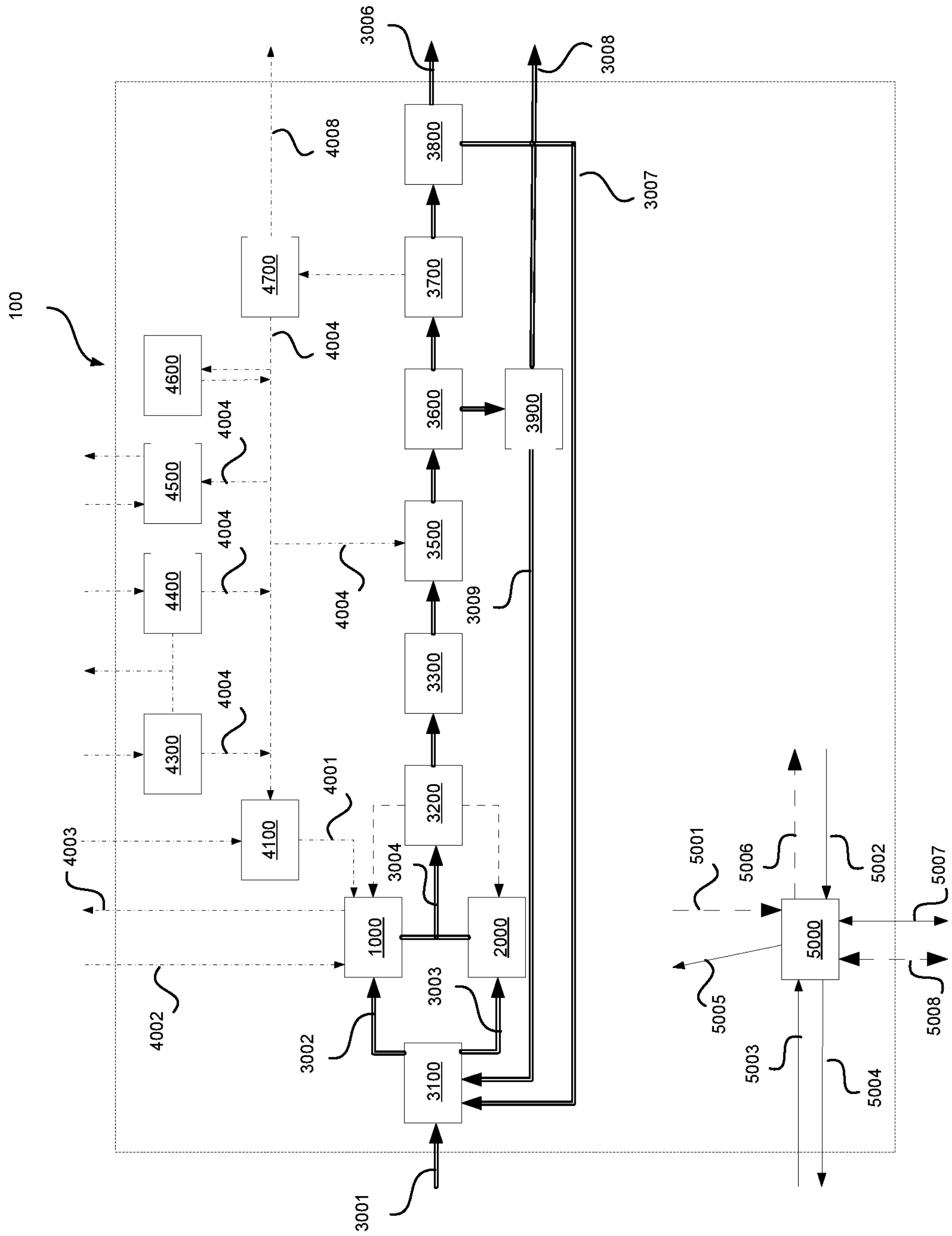
FIG. 2 illustrates an overall system or plant architecture according to an embodiment of the invention in a schematic view.

As shown in FIG. 2 discussed below, a steamcracker plant or system according to the invention may include one or more process units dedicated for the usage, production or storage of hydrogen-rich fractions, e.g. a hydrogen separation unit, an electrolyzer, an ammonia decomposition unit, a fuel cell or a gas storage. This considerably differs from conventional fired steamcrackers, where buffering of hydrogen-rich fuel fractions is typically not necessary, because of fuel gas balancing done via additional natural gas import. In a plant according to the invention, depending on the number of fired furnaces in operation and the set level of combustion air preheating, the plant's fuel gas balance may vary from deficiency (fuel gas import, generation, storage and unloading) to surplus (fuel gas export, consumption and storage loading). In particular, the fuel gas balance may vary change from deficiency to surplus and vice-versa during plant operation, depending on current operational requirements, as mentioned above, e.g. for electrical grid stabilization.

In a steam cracking system with purely electric furnaces, a hydrogen-rich fraction could only be consumed in limited quantities, e.g. as feed for hydrogenation reactors, and can otherwise be only stored or exported, since the plant cannot make direct use of hydrogen as primary energy carrier. An indirect usage of a hydrogen-rich fraction can be made by converting it to electricity in a fuel cell, but thereby causing noticeable energy losses. The invention offers the benefit of using large quantities of a hydrogen-rich fraction as a direct energy carrier, with very high levels of fuel utilization, i.e. low energy losses.

Various patent documents mention the potential use of hybrid furnaces with combined fired and electric coil heating within the same furnace system, i.e. particularly in the same furnace firebox. The invention knowingly excludes this solution, since the state-of-the-art offers no viable technical solution on how to design such hybrid furnace in a practical manner, under consideration of all relevant process, safety, systems, operation and material requirements.

The essence of the invention is therefore not to combine the heating principles inside a furnace, but at a larger scale of plant architecture, and by including multiple flexibility measures inside such a hybrid plant setup.

A steam system used according to the invention may comprise several steam headers at different pressure and temperature levels, in order to deliver the heat at a suitable temperature level for each consumer. Contrarily to conventional steamcracker plants where steam is transferred from higher to lower pressure steam headers via turbine stages and/or letdown stations with additional boiler feed water injection, the moderate steam superheating in the furnaces, as is provided according to the invention and further described below, allows to easily transfer steam to lower pressure levels by using valves and/or nozzles. The selected range of initial steam superheating avoids phase change during expansion. Different fired and electric furnace topologies may be used and combined with each other according to the invention.

As mentioned, in current steamcracker plants, the steam exported from the furnaces is consumed by both turbine drives (mechanical energy recovery) as well as by heat exchangers (thermal energy recovery), leading to a combined heat and power system. By electrifying the compressor drives, one can benefit from renewable electricity import and reduce the exergy losses caused by steam-turbine driven compressors or electric generators, which could generally also be used. In return, the modified steam system is preferably reduced to a heat recovery system. According to a particularly preferred embodiment of the invention, and as further explained below, an electrification of at least some of the compressor drives is realized, as mentioned.

In a particularly preferred embodiment, both furnace types (fired and electric) are delivering cracked gas streams that are combined for further processing in the downstream separation sequence and are preferably compressed together, using an electrically driven compressor. In addition, both furnace types produce and preferably export moderately superheated steam, feeding a central steam system, which delivers heat in the form of steam to various process heat consumers inside and outside the steamcracking plant.

The invention therefore, in such an embodiment, presents cracking furnace concepts that are specifically aimed at integration into steamcracker plants without, or at least without large-scale, mechanical energy recovery from steam flows, and that take advantage of this modified use-case to optimize the furnace operation in terms of emission and energy efficiency.

The existing prior art contains no example on how to solve these tasks, because known fired furnace integration concepts rely on generating steam intended for mechanical energy recovery, as abundant waste heat is available in conventional cracking furnaces. Fired furnace integration concepts strictly rely on the existence of a convection zone, in which heat is recovered from a hot flue gas stream. Such a convection zone is absent for electric furnaces as used according to the invention besides fired furnaces, and therefore simply combining known fired furnaces and electric furnaces would result in a situation, where a significant waste heat utilization is necessary and required for the fired, but not necessary and not required for the electric furnaces. The invention provides a solution also in this connection.

In some documents mentioned above, similar challenges are presented, as they include embodiments combining fired furnaces with a partly electrified separation train. The provision of a feed-effluent exchanger is indicated, without giving detailed information about apparatus design or answering open questions about practical realization. The embodiments known from the prior art include the production of highly superheated steam in the convection section, with conventional export steam conditions suitable for usage in a steam turbine, e.g. driving the cracked gas compressor. The solutions provided according to the invention are not proposed, however.

An efficient and effective integration of electric furnaces into a steamcracker is, as mentioned, of paramount importance for the overall plant design, in particular regarding energy management. This is particularly the case when, such as in the present invention, fired furnaces are present as well and electric furnaces are provided in addition thereto. A major difficulty arises from the fact that electrically heated furnaces do not feature a convection zone, as mentioned. This is of such importance since, as it was already mentioned, in fired cracking furnaces 40 to 60% of the overall heat input is recovered in the convection zone and can be used for various purposes.

According to the invention, a method of steam cracking using a steam cracking arrangement or system is proposed, the arrangement or system including a first steam cracking furnace unit or a plurality of first steam cracking furnace units and a second steam cracking furnace unit or a plurality of second steam cracking furnace units. According to the invention, the first steam cracking furnace unit or each of the plurality of first steam cracking furnace units comprises one or more fired steam cracking furnaces, and the second steam cracking furnace unit or each of the plurality of second steam cracking furnace units comprises one or more electric steam cracking furnaces. Further according to the invention, the first steam cracking furnace unit or each of the plurality of first steam cracking furnace units comprises means which are adapted to preheat at least a part of combustion air provided to its fired steam cracking furnace or furnaces to a temperature level of at least 100° C. As to particular advantages of the solution provided by the invention, reference is made to the explanations below while directly hereinafter further advantageous embodiments will be explained.

In the language used herein, the term "furnace unit" shall refer to an arrangement wherein at least one steam cracking furnace and at least one quench cooling train for cracked gas withdrawn from the steam cracking furnace(s) and at least one steam generation arrangement in thermal association with the quench cooling train(s) is provided in operational connection. The term "furnace" is used for an electrically operated steam cracking coilbox and the associated feed preheating and/or steam superheating equipment, as well as for a fired steam cracking coilbox (the radiation zone) and the associated feed preheating and/or steam superheating equipment (the convection zone) and/or combustion air preheating equipment. If therefore, reference is made to a "coilbox" of an electric furnace hereinbelow, this shall refer to the part of the furnace in which the cracking coils are arranged and in which only the process gas is heated to a considerable extent and to a maximum temperature level, but not to preheating equipment for other streams.

In an embodiment of the method according to the invention, partially repeating what was just explained, in the first steam cracking furnace unit or each of the plurality of first steam cracking furnace units and in the second steam cracking furnace unit or each of the plurality of second steam cracking furnace units, the steam cracking furnace or furnaces is or are coupled to at least one quench cooling train in thermal association with at least one steam generation arrangement.

Particularly, in the first steam cracking unit, a first (fired) steam cracking furnace is coupled to a first quench cooling train and, in the second steam cracking unit, a second (electric) steam cracking furnace is coupled to a second quench cooling train. Be it noted that, if "one" steam cracking furnace, which is preferably provided together with further apparatus in a unit referred to as a "steam cracking furnace unit" here, is referred to, this does not exclude that further "first" or further "second" steam cracking furnaces or units may be present and that these may individually or groupwise be coupled with a common "first" or "second" quench cooling train or individually with several "first" or "second" quench cooling trains. If, in the following, reference is made to any unit in the singular, the only reason is to simplify the language for describing the invention without limiting its scope.

In the process according to the invention, particularly process gas streams are passed in parallel through the first steam cracking furnace and the second steam cracking furnace and thereafter through the quench cooling train coupled thereto in each of the first and second steam cracking furnace unit(s).

Using the steam generation arrangements, at least superheated high pressure steam at a first pressure level between 30 and 175 bar absolute pressure and at a first temperature level and no steam at a higher temperature level than the first temperature level is generated, according to the invention. The superheated high pressure steam at the first pressure level is, particularly in a common steam supply and distribution system, at least in part adiabatically and isenthalpically expanded to a second pressure level below the first pressure level such that its temperature level is lowered to a second temperature level, and the first temperature level is selected such that each intermediate temperature level reached at intermediate pressure levels of more than 20 bar during the adiabatic and isenthalpic expansion is between 5 and 120 K above the dew point of steam at the respective intermediate pressure level during the adiabatic and isenthalpic expansion.

According to an embodiment of the invention, the steam cracking furnace(s) of the first and second steam cracking furnace unit(s) may be operated simultaneously with one or more compressors and/or pumps as rotating equipment, particularly for compressing a process gas or "cracked gas" withdrawn from the cracking furnace(s), or gas and/or liquid streams derived therefrom. According to such an embodiment, the rotating equipment is at least partly driven by electric energy. The rotating equipment may particularly form part of one or more separation trains of the steam cracking arrangement which is or are particularly associated with the first and second steam cracking furnace unit(s), or it may be adapted to prepare the one or more process gas streams, or one or more gas streams formed therefrom, for being separated in such one or more separation trains. A separation train may be embodied as generally known from literature and may include steps or equipment selected from demethanizers, deethanizers, depropanizers, splitters, hydrogenation units, absorption columns, rectification columns, refrigeration units, adsorption arrangements and heat exchangers.

The first temperature level at which the superheated high pressure steam is subjected to said adiabatic and isenthalpic expansion according to the invention is preferably selected such that each intermediate temperature level reached at intermediate pressure levels of more than 20 bar during the adiabatic and isenthalpic expansion process is between 10 and 100 K, particularly between 20 and 80 K, above said dew point of steam at the respective intermediate pressure level during the adiabatic and isenthalpic expansion.

In other words, in all cases, the expanded steam is, by selecting the first temperature level according to the invention, kept at moderate superheating levels, while simultaneously being held with a sufficient distance from the boiling point curve throughout the process of expansion for all intermediate pressure levels above 20 bar. The latter is particularly relevant in the case of an expansion starting from a first pressure level of more than 40 bar as in such cases the two-phase region may be reached or at least temporarily passed. This is avoided according to the invention. Furthermore, by limiting the steam superheating according to the invention, the heat exchange duty at high temperatures in the non-essential steam generation process is reduced, thereby increasing the availability of high-temperature heating resources for essential process heating purposes, e.g. feed preheating.

The superheated high pressure steam at the first pressure level and at the first temperature level does preferably not include steam generated from process water and preferably includes only steam generated from boiler feed water. The superheated high pressure steam is therefore preferably high-purity steam as defined above. The superheated high pressure steam is preferably not used in forming the one or more process gas stream, i.e. it does not participate in the steam cracking reactions.

In other words, according to the invention only a moderately superheated high-purity steam stream is generated and exported at a corresponding pressure level, i.e. the first pressure level, the term "exported" relating in this connection to a withdrawal from the steam generation arrangement and not, or not necessarily, from an overall system. This steam may also be referred to as "dry" steam as its superheating level is selected essentially to prevent condensation, which may e.g. result in abrasion during steam transport. For any possibly applied adiabatic and isenthalpic expansion down to a minimum pressure, i.e. the second pressure level, the resulting dew point margin of the steam flow at any intermediate pressure level above 20 bar during the expansion is in the ranges already mentioned before.

The invention proposes, with the measures mentioned already above and particularly further described below in connection with further embodiments, novel concepts which redesign fired steamcracker furnaces in the context of partly electrified, "hybrid" steamcracker plant or system designs.

The solution to limit the superheating of high pressure steam according to an embodiment of the invention breaks with the current state-of-the-art in steamcracker designs based on conventional fired furnaces and turbine-driven large rotating equipment. This technological choice represents the most efficient solution in the context of partly electrified steamcracker designs, "partly electrified" relating to some, but not all of the cracking furnaces and, according to embodiments, to the rotating equipment, while some of the steam cracking furnaces are still provided as fired furnaces according to the invention.

Indeed, the current practice of producing highly superheated high pressure steam in the furnace section (at dew point margins of typically more than 150 K at the furnace outlet) is driven by the abundance of thermal waste energy in the convection section and its possible use in steam turbines for driving compressors and pumps or electric generators. Reduced pressure steam taken from turbine extractions or turbine outlets is furthermore used for providing process heat at various levels. Therefore, in classical arrangements, flexibility in generating and using steam is limited.

Particularly, the electric cracking furnace(s) used according to the invention are provided without a convection zone. If reference is made here to an electric cracking furnace "without a convection zone", this relates to the absence of a zone in which a significant amount of typically more than 500 kW of process heat is continuously recovered from a flue gas stream. In other terms, an electric cracking furnace without a convection zone is a cracking furnace without carbon dioxide emission from flue gas streams that are purposely cooled down to continuously recover significant amounts of typically more than 500 kW of process heat. The furnace system may, however, feature carbon dioxide emission sources for non-process purposes, e.g. safety-related pilot burners at the outlet of gas evacuation stacks. These provide, however, significantly lower amounts of generally non-recoverable heat.

Generally, therefore, in the electric furnace coilbox(es) during hydrocarbon cracking operation, preferably a heat amount of not more than 1000 kW is transferred as sensible heat to streams other than the process gas stream passed through or withdrawn from the electric cracking furnace coilbox(es) according to the invention. Such other streams may for example be high-purity steam streams. Expressed differently, said heat transferred to streams other than the process gas within the coilbox may also be not more than 5% or not more than 3% of the heat transferred to the process gas within the same coilbox. As to the term "coilbox", reference is made to the explanations already given above.

In cracker separation trains used for cracking furnaces according to the invention in a partly electrified system, the use of electric compressor drives instead of steam turbines leads to a reduction of exergy losses. Therefore, after removal of steam turbines, there is no more efficient use for highly superheated high pressure steam in the separation train. Hence, by reducing the level of superheating, the invention allows for using a large portion of the thermal energy recovered in the quench and convection sections of the furnaces for the necessary preheating of the main process stream or its components, i.e. the feed hydrocarbons and/or process steam. Furthermore, and as described further below, such thermal energy may be used in preheating combustion air with which a fuel is combusted.

According to a particularly preferred embodiment of the invention, therefore, one or more process streams, before being passed through one or more cracking furnace coilboxes of the cracking furnace(s) of the first and/or second cracking furnace unit(s), or feed hydrocarbons and/or process steam used in generating the one or more process streams, or air used in combustion, is at least in part heated using heat withdrawn from the one or more process streams downstream of said coilbox(es), i.e. from the "process gas" or "cracked gas" formed therein.

The heat withdrawn from the one or more process streams downstream of said cracking furnace coilbox(es) may particularly at least in part be withdrawn from the one or more process streams downstream of said coilbox(es) in one or more direct feed-effluent heat exchangers, i.e. one or more heat exchangers in which, or in each of which, the process stream or one of the process streams downstream of said coilbox(es) is or are brought into direct thermal contact with the one or more process streams before being passed through said coilbox(es), or the feed hydrocarbons and/or the process steam used in generating the one or more process streams, wherein a "direct thermal contact" is to be understood herein as being realized by a heat transfer through one or more (metallic) interface layers of the one or more direct feed-effluent heat exchangers but not by a heat transfer via an intermediate heat-exchange fluid.

Alternatively or additionally, the heat withdrawn from the one or more process streams downstream of the cracking furnace coilboxes of the cracking furnace(s) of the first and/or second cracking furnace unit(s) may at least in part be withdrawn from the one or more process streams downstream of said coilbox(es) using steam which is thereafter used in heating the one or more process streams before being passed through said coilbox(es), or the feed hydrocarbons and/or the process steam used in generating the one or more process streams.

In one particularly preferred embodiment of the invention, at least a part of the feed preheating, i.e. of heating the one or more process streams, before being passed through the furnace coilboxes of the cracking furnace(s) of the first and second cracking furnace unit(s), or the feed hydrocarbons and/or the process steam used in generating the one or more process streams, may be performed against saturated or moderately superheated high pressure steam in a multistream heat exchanger of the steam generation arrangement.

In all embodiments of the invention, the moderate superheating in the given range, i.e. at the first temperature level, further allows a straightforward and flexible heat supply to process heat consumers, as the distribution to consumers at different temperature levels can simply be done by monophasic, adiabatic and isenthalpic expansion of the moderately superheated steam exported by the furnaces, without need for letdown stations for entire steam levels, particularly involving additional boiler feed water injection for desuperheating, and/or turbine stages as in classical arrangements. In classical arrangements, such measures are necessary as the steam parameters and the steam expansion of superheated steam is largely governed by the steam requirements of the rotating equipment driven thereby.

The steam generation arrangement is particularly used for generating saturated steam and for moderately superheating the saturated steam thereafter. Saturated steam generation may, according to the invention, be predominantly or entirely be performed in the one or more quench cooling trains, i.e. in one or more primary and/or secondary quench exchangers arranged downstream of the cracking furnace coilboxes of the cracking furnace(s) of the first and second cracking furnace unit(s). While the moderate steam superheating provided for according to a preferred embodiment of the invention may predominantly or entirely be performed in one or more convection sections for the fired cracking furnace(s), particularly in heat exchanger bundles located in between feed preheating bundles, it may be performed in the quench cooling train(s) in case of the second (electric) cracking furnace(s) unit(s). The steam superheating can in each case be done in one or more superheating steps, with or without intermediate boiler feed water injection, particularly in the case of heating in a convection zone. A certain degree of boiler feed water preheating can be performed in an economizer bundle (arranged in a convection section of a fired furnace) and/or in one or more secondary or tertiary quench exchangers (arranged in a quench cooling train of a furnace unit).

The terms “primary”, “secondary” and “tertiary” are used, in connection with the quench exchangers, essentially to refer to their position in the quench cooling train while a fixed association in terms of process duty may not be present. Current state-of-the-art for liquid feed furnaces foresees two quench exchangers while three quench exchangers are typically provided for gas feed furnaces. In older furnace designs, setups with only one quench exchanger are commonly found. In standard furnace designs, primary exchangers typically cool against evaporating boiler feed water. Secondary quench exchangers can (partly) vaporize boiler feed water or preheat boiler feed water. Tertiary quench exchangers typically preheat boiler feed water. Noticeable exceptions are those in which quench exchangers are used to preheat the feed.

According to the invention, the quench cooling train is, at least for the electric furnace(s), preferably operated to comprise at least two distinct cooling steps, wherein in a first one of the cooling steps at least a part of the process gas stream withdrawn from the electric cracking furnace is cooled against vaporizing boiler feed water at an absolute pressure level between 30 and 175 bar, particularly between 60 and 140 bar, more particularly between 80 and 125 bar, and wherein in a second one of the cooling steps at least a part of the process gas stream withdrawn from the electric cracking furnace is cooled against a superheated mixture of feed hydrocarbons and process steam used in forming the process gas stream which is thereby heated to a temperature level between 350 and 750° C., particularly between 400 and 720° C., more particularly between 450 and 700° C., i.e. the typical inlet temperature level of a cracking furnace.

The invention differs from all known fired furnace integration systems, at least as far as the electric furnace is concerned, by the fact that neither a feed preheating nor a steam superheating is performed against flue gas (due to the absence of a convection zone). Contrarily to the electric furnace integration concepts proposed previously, the invention explicitly foresees to use steam as a primary energy carrier, more specifically as a heat carrier to process heat consumers at various temperature levels. The steam generation and export conditions are specifically designed to suit the intended purpose of heat distribution inside the steam-cracker plant and an adjacent chemical complex.

Furthermore, the topologies used in embodiments according to the invention for feed hydrocarbon, process steam and boiler feed water preheating up to temperature levels of approximately 300° C., using solely saturated and/or moderately superheated high pressure steam and its resulting condensates, represent an inventive solution for fulfilling these process duties in an electric furnace, in which no additional waste heat from flue gas is available (unlike in fired furnaces). These solutions have the benefit of using a heat medium directly available at the furnace, thereby reducing piping needs, and of minimizing exergy losses by keeping temperature differences in heat exchangers small and preferably performing a subcooling of the condensates formed for maximum heat recovery.

In terms of dynamic behaviour, the possibility to balance and buffer changes in hydrogen or other fuel gas consumption with the steam system (see below for further details) facilitates the integration of such steam cracking plants in industrial complexes preferably supplied with renewable electricity.

By limiting the steam usage to process heat purposes only and setting steam parameters accordingly, according to a corresponding embodiment of the invention, the steam system can be operated flexibly (in relation to pressure and temperature) and can further be used as temporary energy buffer, e.g. by varying the steam superheating and/or pressure levels during operation. This is facilitated by the fact that the produced steam is not used for power generation in steam turbines, which are less tolerant with regard to variations of steam conditions than steam-based heat exchangers.

The variation of electric energy import to electric furnaces can be realized in different ways for the various embodiments, e.g. by modifying the setpoint of controlled outlet temperatures of specific heat exchangers. In one embodiment, such a variation can be realized by reducing the outlet temperature of a steam-supplied heat exchanger what will result in increasing total electric energy import to other heat exchangers and/or coil heating in order to maintain the same chemical production load of the furnace. In embodiments with electric steam superheating, the variation can be done in straightforward manner by varying the duty.

According to the invention, therefore, preferably no steam generated by the one or more steam generation arrangements is used in steam turbine drives delivering shaft powers of more than 1 MW, and preferably not in steam turbines or other rotating equipment as defined above at all. In other words, according to the invention no steam turbines and at least no steam turbines delivering shaft powers of more than 1 MW, are used which are supplied with steam from the steam generation arrangement(s).

According to the invention, as the quench cooling train, preferably a quench cooling train comprising a primary quench exchanger and a secondary quench exchanger is used, the primary quench exchanger being used to perform at least a part of a first cooling step and the secondary quench exchanger being used to perform at least a part of a second cooling step or vice versa. Corresponding embodiments of the invention are particularly further explained with reference to the appended drawings.

According to the invention, a multi-flow heat exchanger in which heat is transferred from the process gas stream withdrawn from the coilbox(es) of the electric cracking furnace(s) is transferred to a boiler feed water stream and/or a steam stream used in forming the superheated high pressure steam and/or an electric steam superheater may be used in the steam generation arrangement. Furthermore, at least a part of the feed hydrocarbons used in forming the superheated mixture of feed hydrocarbons and process steam, i.e. the process stream then to be cracked, may be preheated using at least a part of the process gas stream withdrawn from said coilbox(es) in a multi-flow heat exchanger which is then referred to as a feed-effluent exchanger.

The level of steam superheating provided according to the invention is very suitable if the steam flow exported from the furnace system is solely intended for supplying process heat to consumers. By mere isenthalpic expansion it can be reduced without a phase change to the pressure and temperature levels required by the heat sink, i.e. the heat "consumers". According to the invention, therefore, preferably no steam generated by the one or more steam generation arrangements is used in steam turbine drives delivering shaft powers of more than 1 MW, and preferably not in steam turbine drives or other rotating equipment at all. Particularly, according to the invention, a common steam expansion for moderately superheated high pressure steam generated using heat from the fired and electric furnaces can be performed. However, corresponding steam streams may also alternatively be expanded in separate units.

Particularly, preheating combustion air used in firing the one or more fired cracking furnaces, which is provided according to the invention leads to lower fuel gas consumption and reduced flue gas emissions. This is considered more efficient than using conventionally superheated steam from furnaces without air preheating to produce electricity and is therefore provided for according to an embodiment of the invention using any means suitable and resulting in a combustion air temperature level of above 100° C., preferably above 150° C., more preferably above 200° C., most preferably above 300° C. and e.g. up to 1000° C. Such combustion air preheating may be less advantageous in classical arrangements relying on the large amount of heat of flue gas streams needed for steam production.

In one embodiment, the combustion air is preheated outside the flue gas pathway, also referred to as "external" combustion air preheating. The combustion air preheating is in this embodiment preferably performed by using saturated steam produced in the one or more quench cooling trains, and therefore in one or more multistream heat exchangers forming part of the steam generation arrangement. Alternatively, moderately superheated steam can be used solely or in addition to saturated steam in combustion air preheating. Moreover, external steam taken e.g. from one of a plant's central steam headers, may also be used for at least part of the combustion air preheating process. At least a part of an air preheating section may be bypassed by at least a fraction of the overall gas stream, in order to be able to modify the resulting combustion air preheat temperature during operation.

In a different embodiment, the combustion air is preheated in the flue gas pathway, also referred to as "internal" combustion air preheating. In this embodiment, a combustion air preheating system can comprise one or more multistream heat exchangers with flue gas as hot medium and combustion air as cold medium. In case of a multi-step combustion air preheating, it is also possible to recover heat from flue gas for other process purposes, in between two combustion air preheating steps. Like for (external) combustion air preheating outside the flue gas pathway, at least a part of the combustion air preheat section may be bypassed here by at least a fraction of the overall gas stream, in order to be able to modify the resulting combustion air preheat temperature during operation.

For internal and/or external combustion air preheating, a combustion air compressing device, typically located upstream of the combustion air preheating section, which compensates for the pressure drop of the combustion air preheat exchangers, may be provided. The preferred pressure on the firing side of the radiant section or coilbox lies in the typical slightly subatmospheric range as in conventional cracking furnaces without air preheating. Consequently, an additional flue gas blower/compression device may preferably be located downstream of the convection section outlet.

The arrangement or system provided according to the invention can preferably be operated in energy-flexible manner, i.e. a given chemical production load of a furnace can be provided at differing total fuel gas or electricity consumption rates and particularly also involving using different amounts of gas being subjected to steam cracking in the form of the one or more process streams. The corresponding differences in chemical or electrical energy input can be balanced by a varying energy output in the form of steam, by varying the first temperature level and/or the steam export quantity, i.e. the amount of the superheated high-pressure steam generated. In other words, according to an embodiment of the invention, the steam cracking arrangement or system is operated, in different operating modes, using different total fuel gas consumption rates, in the case of the fired furnaces, or different amounts of electricity, in the case of the electric furnaces, and particularly also different gas amounts provided in the form of the one or more process streams.

The method according to the invention may additionally include that a hydrogen-rich fuel gas is at least temporarily released from an electrolysis unit, an ammonia decomposition unit and/or a hydrogen storage unit (which each may be part of the system or arrangement according to the invention) to supply at least temporarily needed additional fuel gas to the first steam cracking furnace unit or to at least one of the plurality of first steam cracking units and/or to supply other hydrogen consumers.

Particularly, when an at least temporary surplus of a hydrogen-rich fuel gas is generated from a hydrogen separation unit (which may be part of the system or arrangement according to the invention), compared to the overall consumption of hydrogen in the first steam cracking furnace unit or at least one of the plurality of first steam cracking units and/or in other hydrogen consumers, the said surplus of a hydrogen-rich fuel gas is at least temporarily fed to a fuel cell unit and/or a hydrogen storage unit (which may be part of the system or arrangement according to the invention).

As mentioned, according to the invention two different primary energy sources (electricity or fuel gas) are used, with the one (fuel gas) being easier to store than the other one (electricity). According to the invention, the first (fired) steam cracking furnace may, in a first mode of operation, be operated with a higher energy input, as compared to a second mode of operation, while the second (electric) steam cracking furnace may, in the first mode of operation, be operated with a lower energy input, as compared to the second mode. This allows to vary the energy sources and particularly allows for adapting the operation to changing supply conditions such as amount of electricity and fuel gas available and/or their respective costs.

According to a further embodiment of the invention, a fuel gas used in firing the one or more fired cracking furnaces may be heated to a temperature level which is varied during the furnace operation.

A fuel gas used in firing the one or more fired cracking furnaces preferably has a hydrogen content between 0 and 100 wt.-%, preferably between 20 and 100 wt.-%, most preferably between 50 and 100 wt.-%. In this embodiment, in case of a higher hydrogen content, the fuel gas used in firing the one or more fired cracking furnaces may also at least in part be provided using hydrogen generated in an electrolysis or ammonia decomposition unit whose operation may also be part of the method provided according to the invention.

According to the invention, greenhouse gas emissions from the fired furnace unit(s) used may be reduced by 20% to 100%, preferably by 30% to 100%, more preferably by 50% to 100%, as compared to conventional fired furnaces, a conventional fired furnace in this context being operated without combustion air preheating and using a conventional fuel mixture of tail gas (from the cold section of the cracker) and natural gas import.

For further details in relation to the steam cracking system provided according to the invention and preferred embodiments thereof, reference is made to the explanations relating to the inventive method and its preferred embodiments above. Advantageously, the proposed arrangement is adapted to perform a method in at least one of the embodiments explained before in more detail.

Before turning to the more specific description of embodiments of the invention with reference to the Figures, again some details and concepts of the invention and some embodiments will be referred to.

Although it might appear counterproductive or inefficient to expand the exported steam without mechanical energy recovery, one must take into account that the primary energy supply of the claimed furnace is much reduced compared to conventional fired furnaces and that it is preferably supplied in the valuable form of a hydrogen-rich fraction or electricity, preferably from renewable sources. In that sense the invention offers an additional pathway to rearranging the energy balance in fired furnaces (less steam production, more feed preheating) and to including electric furnaces. The invention goes beyond known concepts also by strictly targeting a minimum primary energy consumption in the furnace section and adapting the furnace design/operation to highly electrified separation train topologies.

Indeed, raising the steam superheating level in such furnaces would lead to increasing its overall primary energy demand, what cannot be fully compensated by recovering mechanical energy or electricity in a downstream turbine. Taking into account non-ideal process performance, it is hence from a systems perspective (to a large extent) and from a process/energy perspective (to a smaller extent) more efficient to adiabatically and isenthalpically expand the moderately superheated steam required by process heat consumers. This holds even more true for plants with additional loss generators in the fuel gas provision, e.g. where the hydrogen fired in the furnaces is at least partially provided by electrolysis units and/or ammonia decomposition units.

By limiting the steam usage for process heat purposes and setting steam parameters accordingly, the steam system can be operated flexibly and can further be used as temporary energy buffer, e.g. by varying the steam superheating and/or pressure levels during operation. This is facilitated by the fact that the produced steam is not used for power generation in steam turbines, which are less tolerant regarding variations of steam conditions than steam-based heat exchangers.

During plant operation, the invention allows for instance to modify the air preheating temperature, e.g. by bypassing a certain fraction of the combustion air around one or more preheat exchangers. This will affect the fuel gas consumption, as well as the steam production, and can be used to adapt the plant's temporary energy management. This may be of significant interest if the furnaces use fuel gas partially originating from electrolyser units (or ammonia decomposition units) or if they are combined with electric furnaces in a hybrid plant architecture. The steam production and superheating can also be adapted by varying the optional boiler feed water injection in between two superheating sections.

In general terms, variations of steam production can be done according to the invention by a number of different means, e.g. by changing set points of stream characteristics (temperature, pressure, flow), by (partially) opening/closing bypass lines, by varying equipment-specific process parameters (heat duty, operating pressure) or other changes in process parameters.

Furthermore, the pressure levels in the steam header systems outside of the furnace systems can be varied in embodiments of the invention during operation to create additional buffer capacity in terms of overall steam quantity. Indeed, the overall heat storage capacity results from the summed steam inventory and corresponding heat capacity in the steamcracker, i.e. including all steam header lines between furnaces and steam consumers at different pressure levels.

Summarizing again what was said above, the invention proposes novel concepts which ensure that all duties or requirements listed above are fulfilled for steamcracker furnaces in the context of partly electrified "hybrid" steamcracker designs.

The solution to limit the superheating of superheated high pressure steam provided according to an embodiment of the invention particularly breaks with the current state-of-the-art in current steamcracker designs based on solely fired furnaces and turbine-driven large rotating machinery. This technological choice represents a very efficient solution in the context of "hybrid" designs.

Indeed, the current practice of producing highly superheated high pressure steam in the furnace section (where dew point margins are typically higher than 150 K at the furnace outlet) is driven by the abundance of thermal waste energy in the furnace's convection section and its possible use in steam turbines for driving compressors and pumps. Reduced pressure steam taken from turbine extractions or turbine outlets is furthermore used for providing process heat at various levels.

In electrified cracker separation trains, the use of electric compressor drives instead of steam turbines leads to a reduction of exergy losses in the steamcracker plant. Furthermore, there is no more efficient use for highly superheated high pressure steam in the separation train. Hence, by reducing the level of superheating, the invention leads to the use of a large portion of the thermal energy recovered in the quench section for the necessary preheating of the feed hydrocarbon/process steam mixture, either in a direct feed-effluent heat exchanger or indirectly via superheated high pressure steam generation and use of that steam in feed preheating steps.

By maximizing the use of quench heat usage for feed preheating, the total import of electric energy to an electric furnace is reduced, thereby reducing the furnace's operational cost, facilitating the furnace integration into electrical grid, and reducing the overall exergy loss in the furnace section. Similarly, in fired furnaces according to the invention, the use of quench heat and flue gas heat in the convection section can as well be maximized for feed preheating and, in addition, for combustion air preheating, thereby reducing the total fuel gas consumption in fired furnaces.

Among the embodiments shown, the variants in which the primary quench exchanger is used in steam generation offer the benefit of fastest cracked gas cooling and reaction quenching (high heat transfer coefficient by boiling water), whereas the variants with the primary quench exchanger being designed as feed-effluent exchanger offer the benefit of minimum electric energy import.

The moderate superheating in the given range according to an embodiment of the invention further allows a straightforward and flexible heat supply to process heat consumers, as the distribution to consumers at different temperature levels can simply be done by monophasic, adiabatic and isenthalpic expansion of the moderately superheated steam exported by the furnaces, without need for letdown stations for entire steam levels involving additional boiler feed water injection for desuperheating and/or turbine stages.

In terms of dynamic behavior, the possibility to balance and buffer changes in electricity import with the steam system facilitates the integration of such furnace systems in industrial complexes preferably supplied with renewable electricity.

Further features and embodiments of the invention are listed hereinbelow. All these features and embodiments can be combined with the features and embodiments described hereinbefore and hereinafter without limitation, as far as being encompassed by the scope of the claims and as far as technically feasible or sensible.

The invention is preferably combined with a separation train, in which all gas compressors or pumps with power duties above 1 MW are driven by electric motors.

The exported superheated high pressure steam is most advantageously distributed to various steam pressure levels by adiabatic and isenthalpic expansion elements. Singular heat consumers (e.g. with critical fouling service) may further include an additional desuperheating step (which may be performed by direct water injection or by using a saturation drum).

The steam cracking arrangement may include other units for steam generation from electric energy (e.g. electric heat pump systems and electric boilers).

The exported superheated steam can be expanded to pressure steam levels below 20 bar absolute pressure, e.g. to supply medium and low pressure steam consumers. The selection of 20 bar absolute pressure as lower limit for the characterization of dew point margins at intermediate pressure levels is chosen to facilitate the definition of the curve envelopes for the initial steam superheating, such that the mentioned distance to the boiling point curve is given for all intermediate or second pressure levels above 20 bar. When expanded to pressures below 20 bar absolute pressure, higher values of dew point margins may occur, without limiting the scope of the invention.

In addition to the inherent energy storage possibility through hydrogen storage tanks and/or variation of steam superheating/pressure, the invention can further be combined with other dedicated energy storage systems, e.g. latent heat storage systems or similar.

The invention is preferably combined with a separation train including a hydrogen separation unit in which all or most of the hydrogen available in a feed to the separation train (typically 70, 75 or 80 to 100%) is recovered in the form of a process stream predominantly composed of hydrogen and used for firing in the furnaces and/or supplying other process units, such as e.g. hydrogenation units.

The furnace system according to the invention is preferably used in steamcracker plants or systems including an electrolyzer unit which produces hydrogen from electricity import, preferably produced by regenerative means. Alternatively, or additionally, the plant or system may feature an ammonia decomposition unit, producing hydrogen from imported ammonia (the latter being preferably produced using renewable electricity at a different location).

An embodiment with a feed-effluent primary quench exchanger and moderate steam superheating is also covered by the invention.

The invention and embodiments thereof are further explained in connection with the appended drawings.

FIG. 2 illustrates an overall system or plant architecture according to an embodiment of the invention in a schematic view of a system 100.

In the system 100, a first or fired steam cracking furnace unit, here indicated 1000, and a second or electrified steam cracking furnace unit, here indicated 2000, are provided. Embodiments of the furnace units 1000 and 2000 are illustrated in FIGS. 4 to 16 hereinbelow and denoted 1100 to 1500 and 2100 to 2800.

In FIG. 2, double-lined arrows indicate hydrocarbon feed, process gas, or cracked gas streams and streams formed therefrom, such as hydrocarbon fractions. Dash-dotted arrows refer to fuel gas, air, flue gas and vent streams. Finely dotted arrows indicate process steam streams while coarsely dotted arrows indicate superheated steam streams. Condensate streams are indicated with solid arrows.

A hydrocarbon feed 3001 is pretreated and preheated in a pretreatment and preheating unit 3100 to which further streams mentioned below are also provided. From the pretreatment and preheating unit 3100, pretreated feed streams 3002 and 3003 are supplied to the fired steam cracking furnace unit 1000 and to the electric steam cracking furnace unit 2000. Cracked gas streams may be combined to form a stream 3004 which is passed on to a cracked gas cooling and process steam generation unit 3200 from which process steam streams generated from process water separated therein and not individually labelled may be passed into the fired steam cracking furnace unit 1000 and to the electric steam cracking furnace unit 2000.

After a compression in a compression unit 3300 that may also operate as a sour gas removal unit, a precooling, drying and raw gas hydrogenation may be performed in a corresponding unit 3500 to which a hydrogen stream 4004 may be supplied. Thereafter, the process gas is passed further to a deethanization unit 3600, forming corresponding fractions which may be passed into a demethanization unit 3700 and a corresponding splitter unit 3800 to form an ethylene product 3006 and an ethane recycle stream 3007 on the one hand, and to a debutanization step 3900 on the other hand, forming a gasoline product stream 3008 and a further recycle stream 3009.

The separation sequence shown in FIG. 2 presents only one of many possible options, depending on feed type and preferred product spectrum. The invention shall not be limited to the separation sequence shown in FIG. 2, but cover all commonly known separation sequences in steam cracking plants. These shall include e.g. separation sequences for gas feed crackers with separate C2, C3 and/or C4 hydrogenation units instead of a raw gas hydrogenation unit, separation trains with different process unit sequence orders (front-end demethanizer or front-end depropanizer), or separation trains for heavier gas and liquid feedstocks, typically including additional process units for treating the heavier hydrocarbon products.

A fuel gas system 4100 is associated with the first (fired) cracking furnace unit 1000 and provides a fuel gas stream 4001 to the first (fired) cracking furnace unit 1000, the latter being also supplied with an air stream 4002. A flue gas stream 4003 may be vented or flue-gas treated before being vented to the atmosphere. Hydrogen streams 4004 may, in the example shown, be provided by an ammonia decomposition unit 4300 and/or an electrolyzer unit 4400 to which ammonia and water are supplied, respectively, and from which vent streams may be withdrawn. A hydrogen stream 4004 may also be supplied to a fuel cell unit 4500 operated with air or purified oxygen. A flue gas stream is withdrawn from the fuel cell unit 4500. A fuel gas or hydrogen storage unit 4600 may also be provided. In a hydrogen separation unit 4700, a light gas mixture from the demethanizer unit 3700 is treated, providing a hydrogen stream 4004 and a remaining methane fraction 4008.

A steam and boiler feed water unit 5000 is provided, this unit being supplied with steam 5001 from the furnace units 1000 and 2000, condensate 5002 from internal process heat consumers, as well as boiler feed water 5003. From the steam and boiler feed water unit 5000, a condensate stream 5004 may be withdrawn and passed on to a treatment unit not shown. Boiler feed water 5005 may be supplied to the furnace units 1000 and 2000. Steam for internal process heat consumers is supplied as a steam stream 5006. The unit 5000 may exchange condensate and steam streams 5007 and 5008 with external units.

Figure 3:
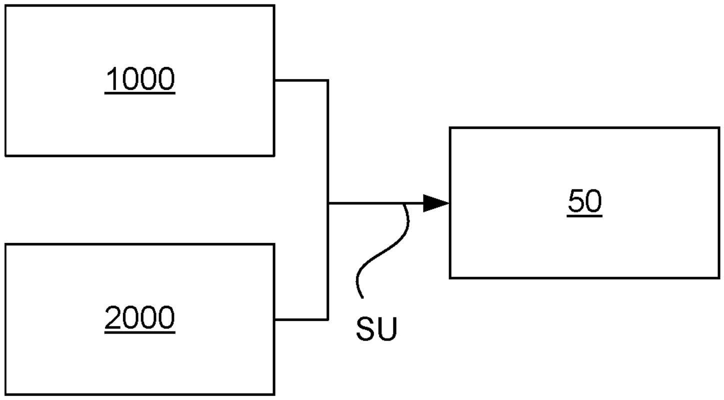
FIG. 3 illustrates a connection between fired and electric steam cracking furnace units in a hybrid concept according to the invention.

FIG. 3 illustrates a connection between fired and electric steam cracking furnace units 1000 and 2000 in a hybrid concept according to the invention in a highly simplified view, in order to show the connection possibilities of the steam cracking units further illustrated in the subsequent Figures.

As before, a first or fired steam cracking furnace unit, here indicated 1000, and a second or electrified steam cracking furnace unit, here indicated 2000, is provided. Embodiments are illustrated in FIGS. 4 to 16 shown hereinbelow.

In a (common) steam utilization arrangement, which is denoted 50 for reference purposes only, and which is further explained below in more detail, (moderately) superheated high pressure steam SU is used for heating purposes but preferably not substantially for driving rotary equipment. Herein, the superheated high pressure steam SU is particularly adiabatically and isenthalpically expanded using expansion units, forming high pressure steam HP, medium pressure steam MP and low pressure steam LP which may be supplied to heat consumers.

Figure 4:
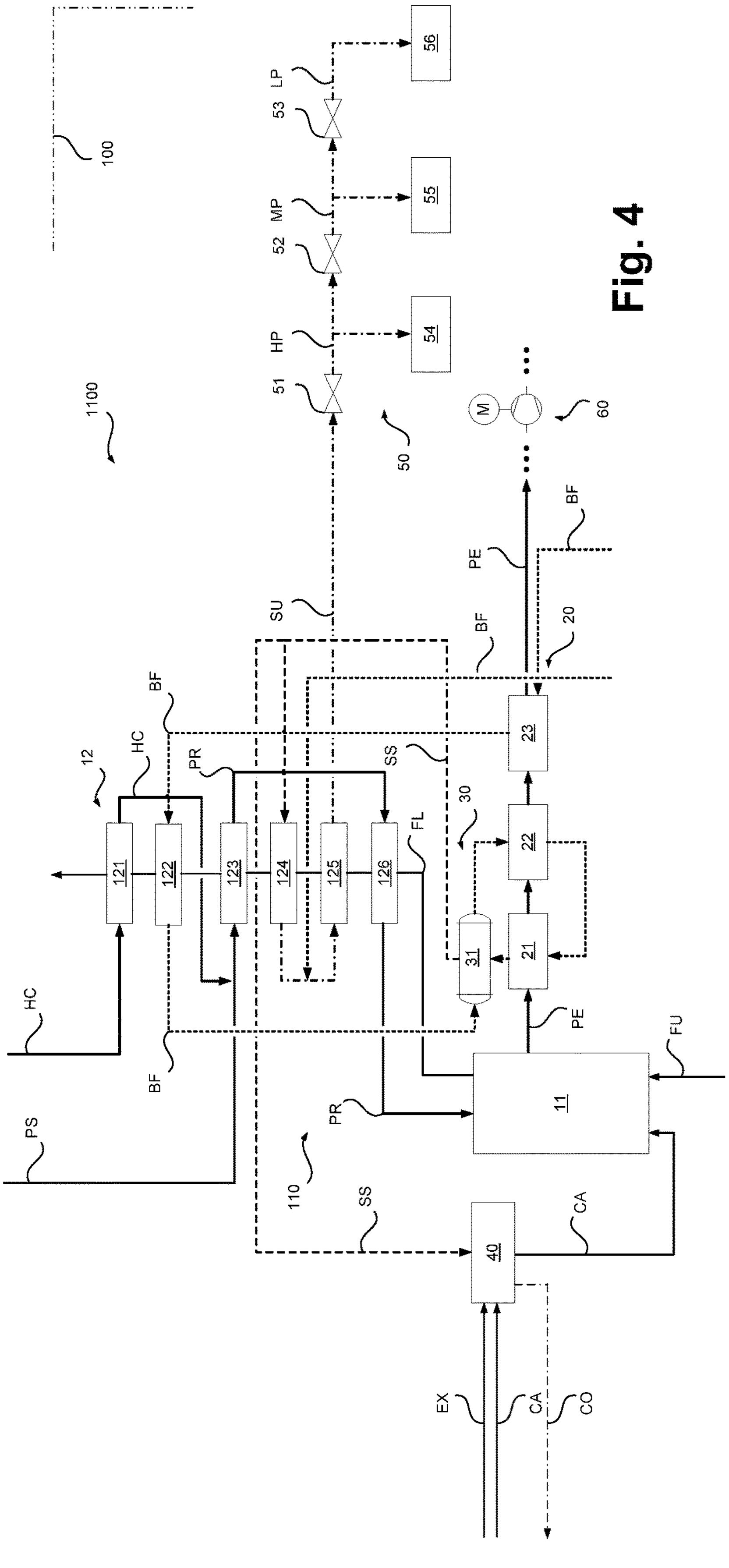
FIGS. 4 to 8 illustrate fired steam cracking furnace units usable in a hybrid concept of the invention as shown in FIG. 3.

In FIG. 4, a fired steam cracking furnace unit 1100 usable in a hybrid concept according to an embodiment of the invention, such as shown in FIG. 3 as unit 1000, and therefore adapted for use in implementing a method of steam cracking according to an embodiment of the invention, and optionally being part of a system 100 according to the invention, is illustrated. As in the subsequent Figures showing steam cracking furnace units as well, method steps of the method may be realized by corresponding process units or devices used and explanations relating to method steps may therefore likewise relate to such process units and devices and vice versa. Repeated explanations are omitted for reasons of conciseness only and mixed language describing the units or systems and the methods according to the embodiments of the invention is used for clarity. If components are described in the singular, this does not exclude that such components are provided in plurality. The steam cracking furnace unit 1100, such as the other steam cracking furnace units shown below, may be part of a system 100 according to an embodiment of the invention as shown before, which may include a plurality of further components and whose possible system boundaries are very schematically illustrated in FIGS. 4 and 9 only.

Figure 20:
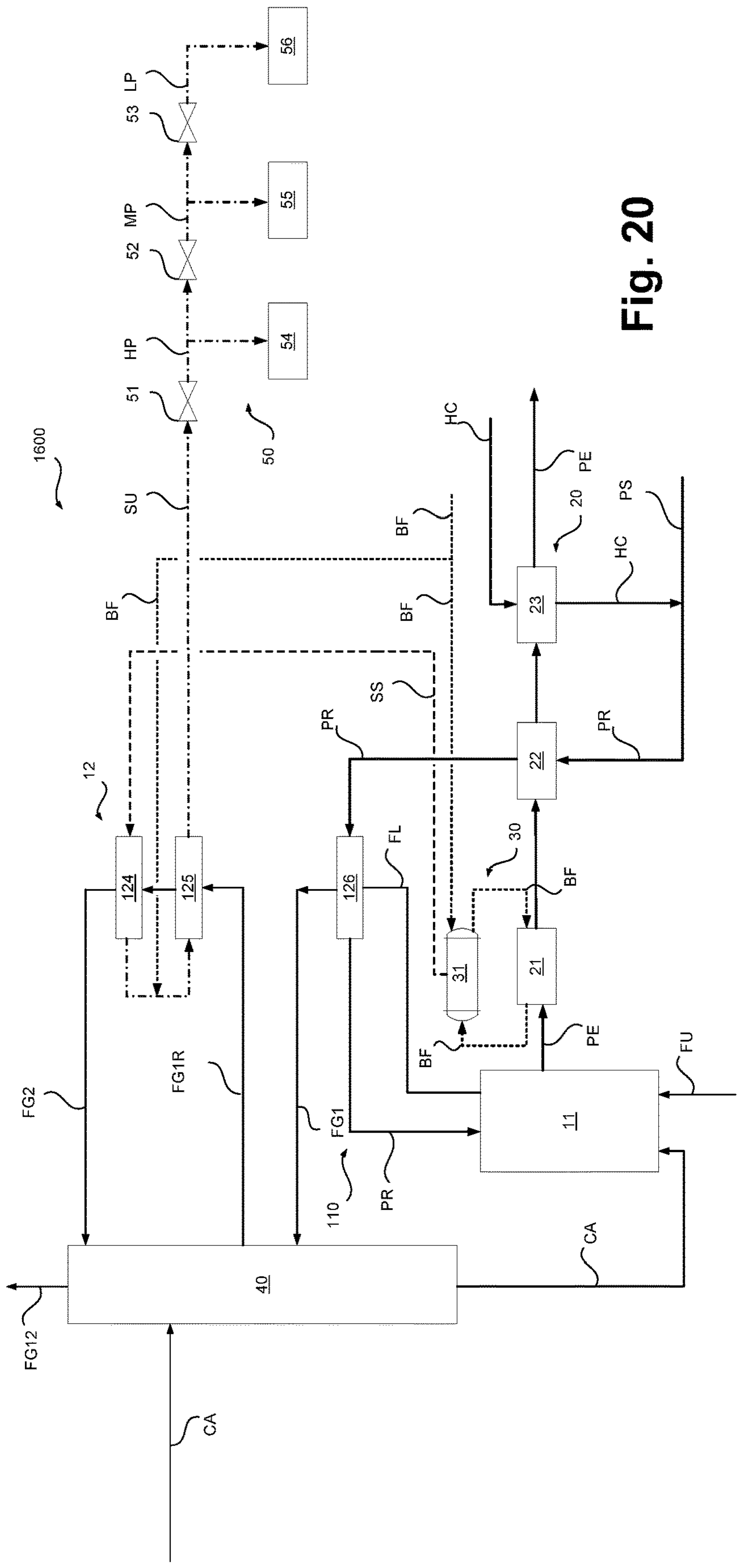
FIG. 20 illustrates a further fired steam cracking furnace unit usable in a hybrid concept of the invention as shown in FIG. 3.

In FIGS. 4 to 16 as well as in FIG. 20, thick solid arrows indicate hydrocarbon feed, process steam, process gas, or cracked gas streams and streams formed therefrom, such as hydrocarbon fractions. Thin solid arrows refer to fuel gas, air, flue gas and vent streams. Finely dotted arrows indicate liquid boiler feed water streams, while dashed arrows indicate saturated high-purity steam streams, and dash-dotted arrows indicate superheated high-purity steam streams. Condensate streams are indicated with double-dash dotted arrows.

The steam furnace unit 1100 includes using a fired steam cracking furnace 110 which is formed by or includes a fired radiant zone 11 and a convection zone 12, as generally described before. In the convection zone 12, a feed preheater 121, an economizer 122, a first high temperature coil 123, a first steam superheater 124, optionally a second steam superheater 125 and a second high temperature coil 126 are arranged in a flue gas channel or duct in the embodiment shown. Particularly the second steam superheater may be omitted if no boiler feed water injection (see below) is performed. A flue gas stream FL is passed from the radiant zone 11 through the convection zone 12, leaving the convection zone 12 at a temperature level of, in the present embodiment, about 89° C. The radiation zone 11 is fired using a fuel gas stream FU and combustion air CA which is, in the example shown, preheated to a temperature level of about 300° C.

A primary quench exchanger 21, a secondary quench exchanger 22 and a tertiary quench exchanger 23 are arranged in a process gas pathway, forming a quench cooling train 20 of the steam cracking furnace unit 1100.

A steam generation arrangement 30 is provided and includes a steam drum 31 and other components used in generating steam. Generally, if throughout the description, reference is made to a component belonging to one arrangement or group of components primarily described with a certain function, this does not exclude that this component is not also part of a different arrangement or group of components having an additional or different function, as typical for a plant comprising interconnected parts. For example, the primary quench exchanger 21, the secondary quench exchanger 22 and the third quench exchanger 23 are described here as being part of the quench cooling train 20, but they are also integrated into the steam generation arrangement 30.

A combustion air preheating unit 40, which is arranged externally to the flue gas duct and therefore externally to the convection section 12 in the embodiment shown in FIG. 4, is also part of the steam cracking furnace unit 1100.

In the method using the steam cracking furnace unit 1100 in a corresponding system 100, process steam PS and feed hydrocarbons HC are supplied to the steam cracking furnace unit 1100. The feed hydrocarbons HC are heated in the feed preheater 121 before being combined with the process steam PS, forming a process stream PR which is further heated in the high temperature coils 123 and 126 before being supplied to the fired radiant zone 11. The process stream, now also referred to as cracked gas or process gas and indicated with PE for clarity, is withdrawn from the radiant zone 11 and quench cooled in the primary quench exchanger 21, the secondary quench exchanger 22 and the tertiary quench exchanger 23 as generally described before.

Figure 9:
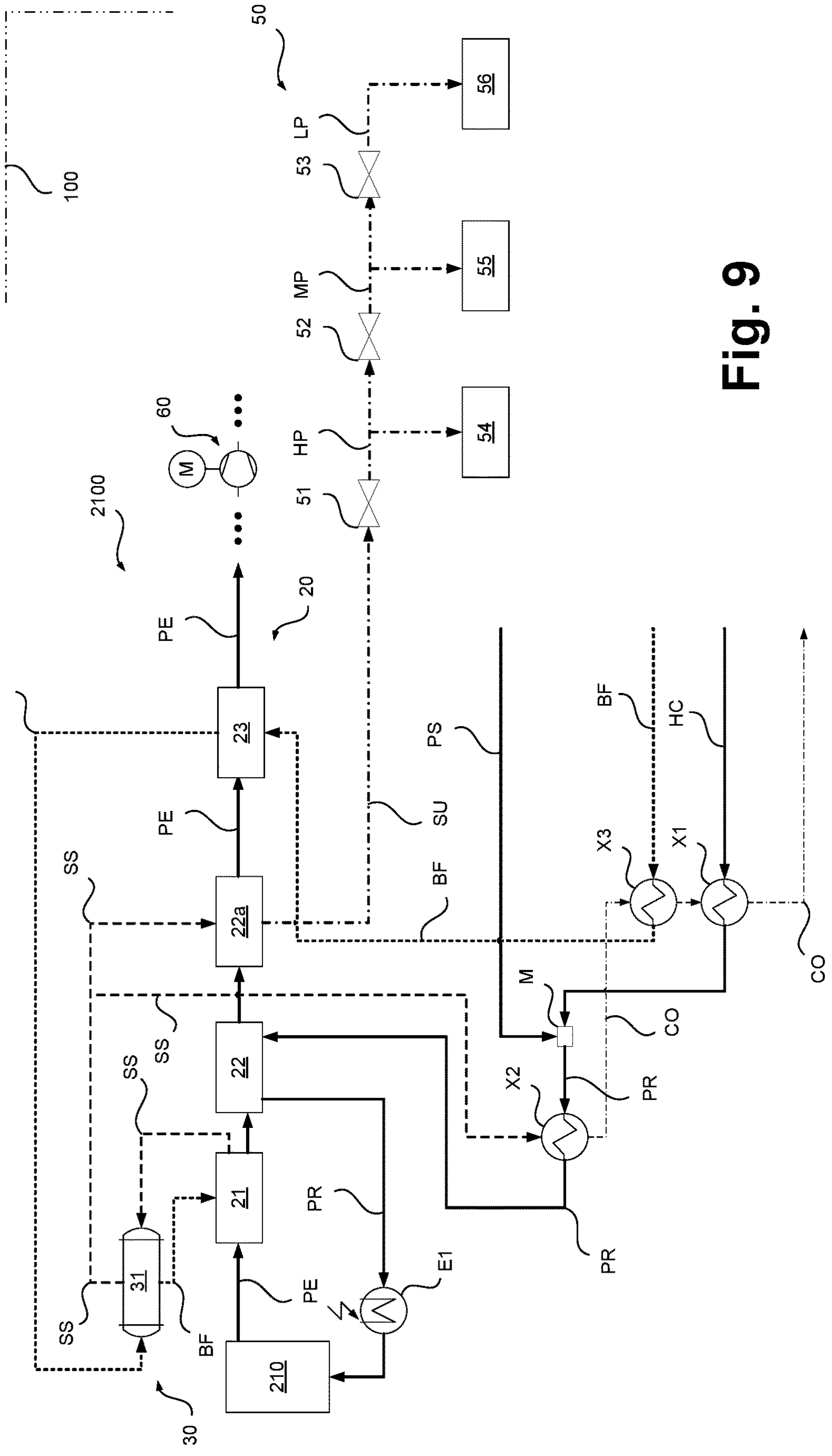
FIGS. 9 to 16 illustrate fired steam cracking furnace units usable in a hybrid concept of the invention as shown in FIG. 3.

Thereafter the process stream PE may be, as only shown in FIGS. 4 and 9, subjected to any type of processing which includes, according to an embodiment of the invention, compression in a compressor 60, particularly a process gas compressor, which is driven by an electric motor M. As to further details, reference is made to the explanations above. Particularly a separation train is provided in which all or essentially all compressors are driven electrically.

Boiler feed water BF, as also illustrated with dotted arrows, is heated in the tertiary quench exchanger 23 and in the economizer 122 before being supplied to the steam drum 31 from which a boiler feed water BF circuit is also formed through the secondary and primary quench exchangers 22, 21. Saturated steam SS withdrawn from the steam drum 31, as also illustrated with dashed arrows, is partly superheated in the steam superheaters 124, 125, forming (moderately) superheated high pressure steam SU, as also illustrated with dash-dotted arrows, and partly supplied to the combustion air preheating unit 40. Parameters of the superheated high pressure steam SU have been extensively described before. In the embodiment shown, this may have a temperature of about 380° C. and an absolute pressure of about 117 bar. Between the steam superheaters 124, 125, further boiler feed water BF may be added (so-called boiler feed water injection as already mentioned above) which is preferably not preheated and which is particularly used to generally control the heat balance within the convection zone 12, e.g. for an adaptation to different operating points. If no boiler feed water injection is provided, the steam superheater 125 may also be omitted, as mentioned.

Combustion air CA to be preheated and optionally external steam EX are also supplied to the combustion air preheating unit 40. From the combustion air preheating unit 40, a condensate stream CO is withdrawn which may be used as a part of the boiler feed water BF extensively discussed before.

In a steam utilization arrangement, which is denoted 50 for reference purposes only, and which is particularly coupled to further steam cracking furnace units as well, such as steam cracking furnace units featuring electrically heated steam cracking furnaces, the superheated high pressure steam SU is used for heating purposes but preferably not substantially for driving rotary equipment. Herein, the superheated high pressure steam SU is adiabatically and isenthalpically expanded using expansion units 51, 52, 53, forming high pressure steam HP, medium pressure steam MP and low pressure steam LP which is supplied to heat consumers 54, 55, 56. Steam (high-pressure or super-high-pressure steam) exported from all furnaces may be collected in a corresponding steam header, i.e. a large-volume piping system which distributes the steam over the plant to the different consumers. The supply connection to the lower pressure steam headers is made from this highest pressure header. In conventional plants, such a steam header is operated at approx. constant pressure (for operation of the turbines), which is slightly below the steam export pressure at the furnace outlet. According to embodiments of the present invention, the pressure level of the highest pressure steam header can be varied more extensively, to achieve an advantageous buffer effect.

Summarizing the above, in the steam cracking furnace unit 1100 according to FIG. 4, the combustion air CA is preheated outside the flue gas pathway ("external air preheating"). The saturated steam SS production is entirely done in the quench cooling train 20 (with the primary and secondary quench exchangers 21, 22), while the moderate steam superheating is done in the convection section 12 in between the high temperature coils 123 and 126. The steam superheating can be done in one or more superheating steps, with or without intermediate boiler feed water injection. A certain degree of boiler feed water preheating can be done in an economizer 122 and/or in a tertiary quench exchanger 23, as shown.

The combustion air preheat is preferably done by using saturated steam SS produced in the quench section 20, in one or more multistream heat exchangers. Alternatively, moderately superheated steam can be used solely or in addition to saturated steam in the air preheat section (not shown in FIG. 4). Moreover, external steam EX taken, e.g. from one of the plant's central steam headers, may also be used for at least part of the combustion air preheating process. At least a part of the combustion air preheating unit 40 may be bypassed by at least a fraction of the overall gas stream, in order to be able to modify the resulting air preheat temperature during operation.

Further not shown in the Figures is an air compressing device typically located upstream of the combustion air preheating unit 40, which compensates for the pressure drop of the combustion air preheat exchangers. The preferred pressure on the firing side of the radiant section and further details were mentioned before.

Figure 5:
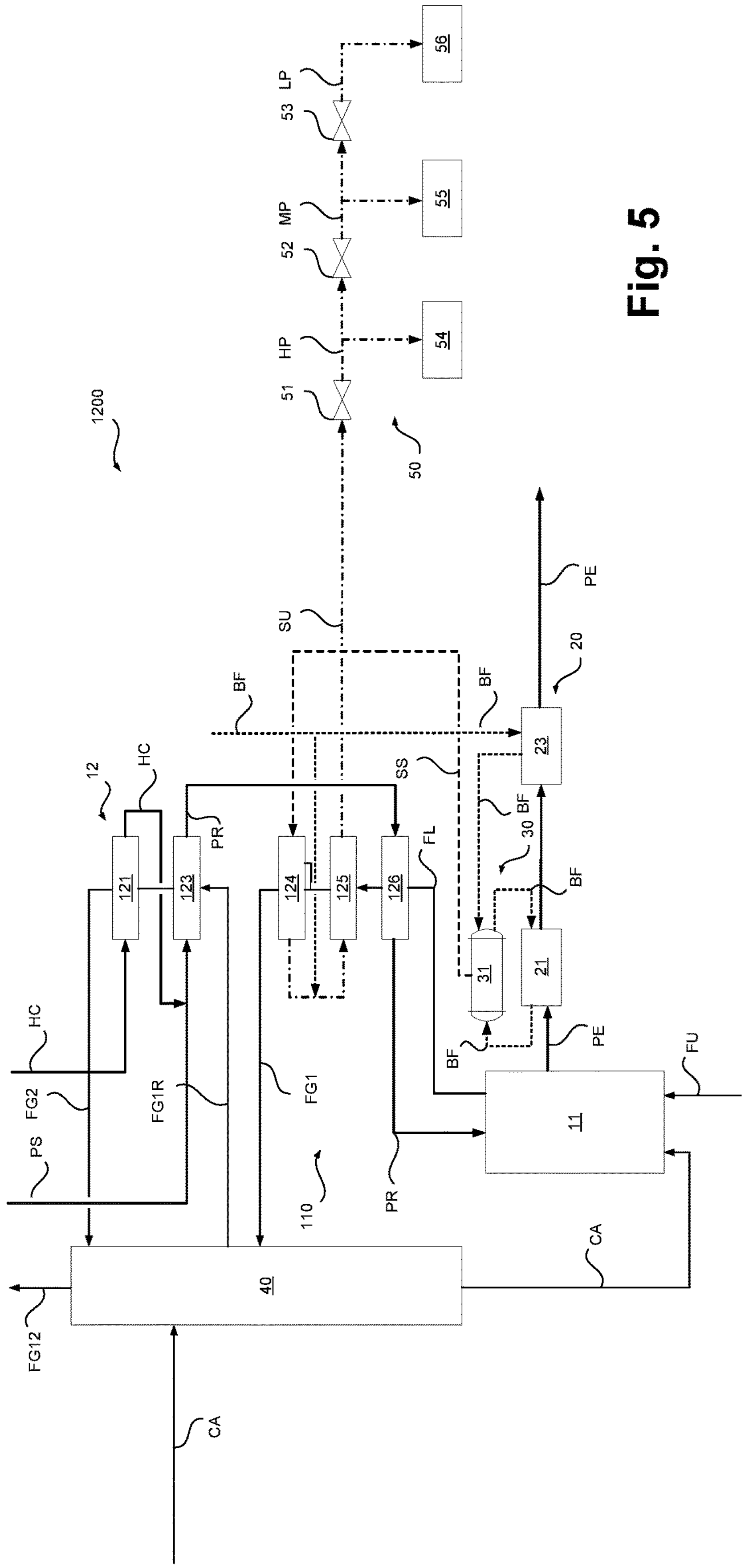

In FIG. 5, a further steam cracking furnace unit 1200 according to an embodiment of the invention is illustrated.

Generally, the explanations relating to the steam cracking furnace unit 1100 according to FIG. 4 likewise apply to the steam cracking furnace unit 1200 according to FIG. 5 and only differences will be explained below.

In the steam cracking furnace unit 1200 according to FIG. 5, the combustion air preheating unit 40 is integrated into the flue gas channel or duct and is also not supplied with saturated steam SS as in the steam cracking furnace unit 1100 according to FIG. 4. The economizer 122 is omitted in the convection section 12 and consequently boiler feed water BF is not heated in the convection section 12 in such an economizer. The quench cooling section is now composed of only two exchangers 21 and 23, with the quench exchanger 22 being also omitted. The boiler feed water BF is preheated in the secondary quench exchanger 23 and the steam drum 31 is connected with the primary quench exchanger 21.

From a position between the first steam superheater 124 and the first high temperature coil 123, and from a position downstream of the feed preheater 121, at least parts of the flue gas FG, indicated with FG1 and FG2 in FIG. 5, are passed to the multiple stages of the combustion air preheating unit 40. A flue gas return stream FG1R from the high-temperature stage of the combustion air preheating unit 40 is then routed to the first high temperature coil 123. After being used for heating purposes in the low-temperature stage of the combustion air preheating unit 40, the flue gas leaves the combustion air preheating unit 40 at a temperature of about 70° C. in this example. Combustion air CA, but preferably no external steam EX, is supplied to the combustion air preheating unit 40 and therefore preferably no condensate stream CO is formed. The preheated combustion air CA is supplied to the radiation zone 11 at a temperature level of, in the example shown, about 280° C.

It is to be noted that other configurations and combinations of the multiple steps of a combustion air preheating unit 40 with the multiple heat exchanger bundles of a convection zone 12 can be foreseen without limiting the scope of the invention. For instance, a high-temperature stage of the combustion air preheating unit 40 may be inserted at different points in between exchanger bundles of a convection zone 12, either further upstream or downstream than shown in FIG. 5.

Summarizing the above, in the steam cracking furnace unit 1200 according to FIG. 5, the combustion air CA is preheated inside the flue gas FG pathway ("internal air preheating"). Such an air preheating system can be composed of one or more multistream heat exchangers, with flue gas FG as hot medium, and the combustion air CA as cold medium. In case of a multi-step air preheating, it is also possible, in between two combustion air CA preheating steps, to recover heat from flue gas FG for other process purposes. As for the external combustion air CA preheating as illustrated in connection with the steam cracking furnace unit 1100 according to FIG. 4, at least a part of the combustion air CA preheat section may be bypassed by at least a fraction of the overall gas stream, in order to be able to modify the resulting air preheat temperature during operation.

Water boiling is, in the steam cracking furnace unit 1200 according to FIG. 5, performed in a single primary quench exchanger 21, but a combination of primary and secondary quench exchangers 21, 22 (as shown in FIG. 4) can be used in equivalent manner. Moreover, this embodiment does not feature a boiler feed water BF preheating step in the convection section 12, hereby prioritizing the availability of flue gas FG heat for combustion air preheating, as explained.

Figure 6:
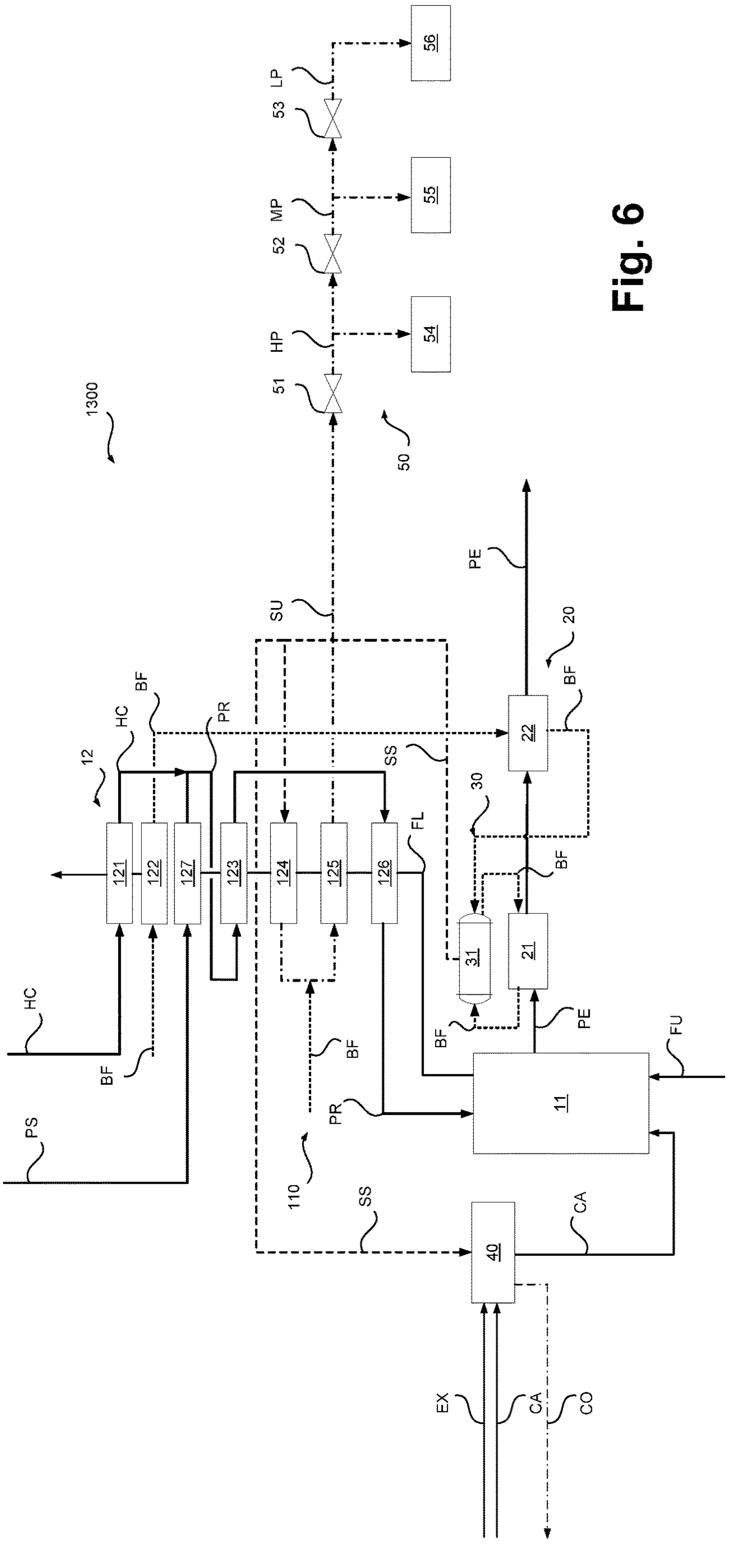

In FIG. 6, a further steam cracking furnace unit 1300 according to an embodiment of the invention is illustrated. Generally, the explanations relating to the steam cracking furnace unit 1100 according to FIG. 4 likewise apply to the steam cracking furnace unit 1300 according to FIG. 6 and only differences will be explained below. The steam cracking furnace unit 1300 according to FIG. 6 is to be considered more typical for furnaces cracking liquid feeds, whereas the steam cracking furnace units 1100 and 1200 according to FIGS. 2 and 3, respectively, show typical design features of gas feed cracking furnaces.

As compared to the steam cracking furnace unit 1100 according to FIG. 4, the tertiary quench exchanger 23 is omitted in the steam cracking furnace unit 1300 according to FIG. 6. Boiler feed water BF supplied to the steam drum 31 is, after preheating in the economizer 122, preheated in the secondary quench exchanger 22. The steam drum 31 is connected with the primary quench exchanger 21.

Since higher preheating duties are required for liquid feed furnaces (additional latent heat of feed vaporization), the steam cracking furnace unit 1300 further includes an additional process steam superheater bundle 127, in which process steam is superheated against flue gas before being mixed with the hydrocarbon feed stream.

Figure 7:
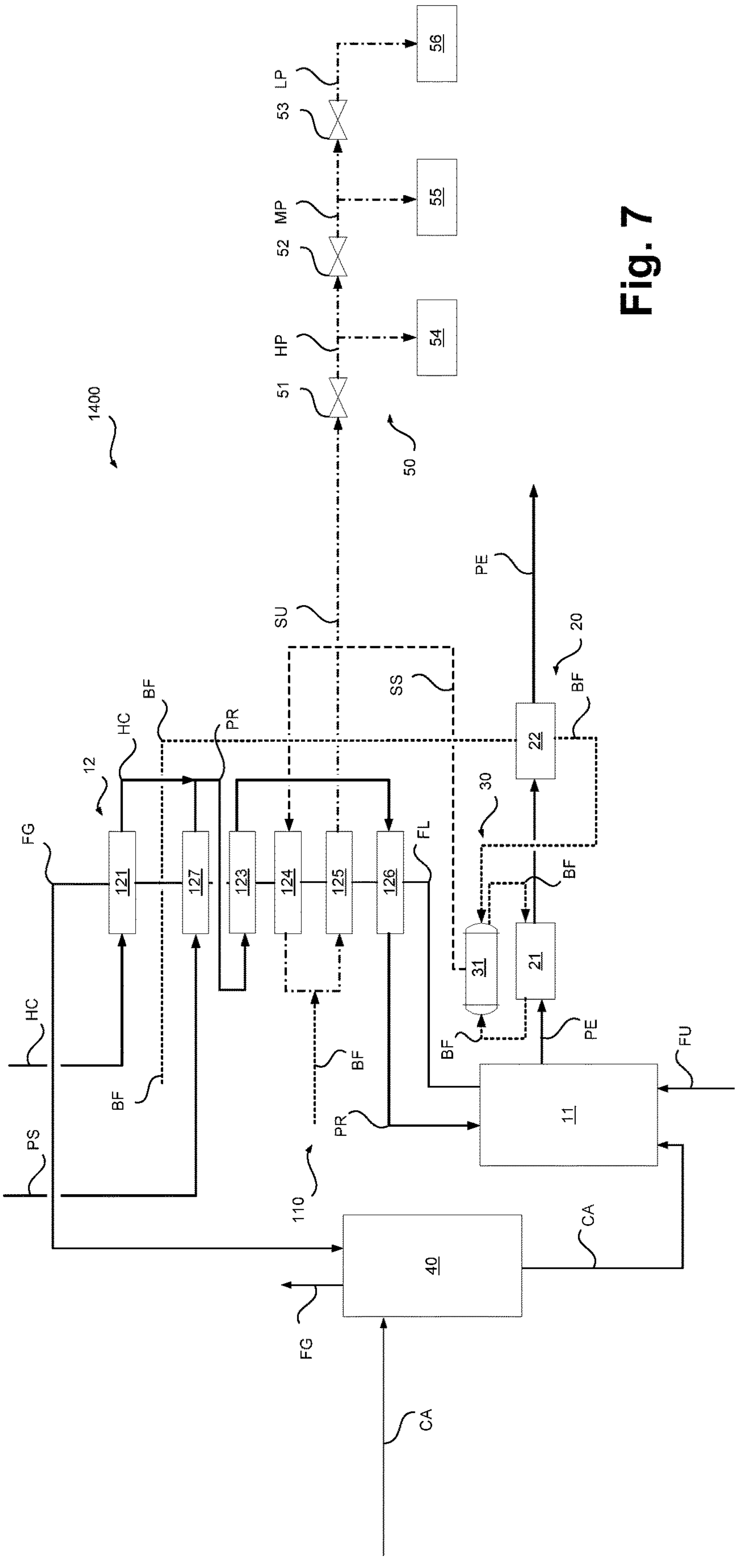

In FIG. 7, a further steam cracking furnace unit 1400 according to an embodiment of the invention is illustrated. Generally, the explanations relating to the steam cracking furnace units 1200 according to FIGS. 5 and 1300 according to FIG. 6, based on the explanations relating to the steam cracking furnace unit 1100 according to FIG. 4, likewise apply to the steam cracking furnace unit 1400 according to FIG. 7 and only differences will be explained below. The steam cracking furnace unit 1400 according to FIG. 7 particularly combines features of the steam cracking furnace units 1200 according to FIGS. 5 and 1300 according to FIG. 6.

Similarly as in the steam cracking furnace unit 1200 according to FIG. 5, the combustion air preheating unit 40 is, in the steam cracking furnace unit 1400 according to FIG. 7, integrated into the flue gas channel or duct and is also not supplied with saturated steam SS as in the steam cracking furnace unit 1100 according to FIG. 4. The economizer 122 is omitted in the convection section 12 and consequently boiler feed water BF is not heated in the convection section 12.

As in the steam cracking furnace unit 1300 according to FIG. 6, the tertiary quench exchanger 23 is omitted in the steam cracking furnace unit 1400 according to FIG. 7, particularly when compared to the steam cracking furnace unit 1100 according to FIG. 4. Boiler feed water BF supplied to the steam drum 31 is therefore, not being preheated in an economizer, solely preheated in the secondary quench exchanger 22. The steam drum 31 is connected with the primary quench exchanger 21.

From a position downstream of the feed preheater 121 only, particularly as compared to the steam cracking furnace unit 1200 according to FIG. 5, the flue gas FG is passed to the combustion air preheating unit 40. After being used for heating purposes therein, the flue gas FG leaves the combustion air preheating unit 40 at a temperature of about 90° C. in this example.

The steam cracking furnace units 1300 and 1400 as shown in FIGS. 6 and 7 may particularly be operated with liquid feedstock. In such situations, and also in the steam cracking furnace units 1300 and 1400 as shown in FIGS. 6 and 7, a tertiary quench exchanger 23 is typically omitted, yielding higher cracked gas temperatures at the considered furnace outlet. This is advantageous to avoid condensation of heavy condensates when cooling the cracked gas further. Hence, in liquid feed crackers, the cracked gas cooling downstream of the primary quench exchanger 21 is classically done by direct contact cooling with injections of pyrolysis oil/gasoline and/or quench water. According to the embodiments of the invention shown, the primary and secondary quench exchangers 21, 22 are integrated as shown.

Like the steam cracking furnace unit 1300, since higher preheating duties are required for liquid feed furnaces (additional latent heat of feed vaporization), the steam cracking furnace unit 1400 further includes an additional process steam superheater bundle 127, in which process steam is superheated against flue gas before being mixed with the hydrocarbon feed stream.

Figure 8:
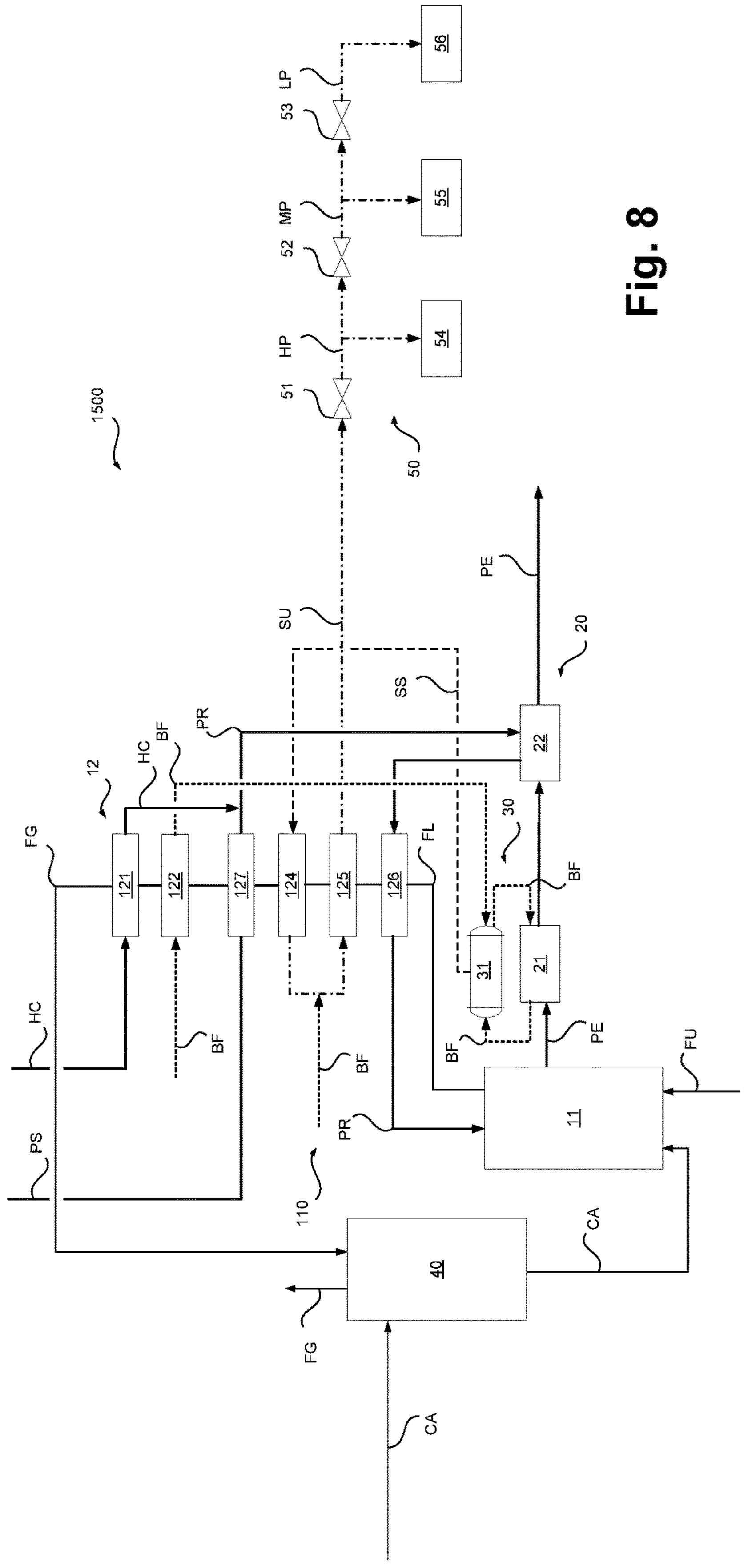

In FIG. 8, a further steam cracking furnace unit 1500 according to an embodiment of the invention is illustrated. Generally, the steam cracking furnace unit 1500 according to FIG. 8 shows some similarities to the steam cracking furnace unit 1400 according to FIG. 7 and therefore the steam cracking furnace unit 1500 according to FIG. 8 will be explained on this basis, again with reference to the steam cracking furnace unit 1100 according to FIG. 4, 1200 according to FIGS. 5 and 1300 according to FIG. 6, however, where applicable.

In contrast to the steam cracking furnace unit 1400 according to FIG. 7, the economizer 122 explained e.g. in connection with the steam cracking furnace unit 1100 according to FIG. 4 is present, preheating the boiler feed water BF, but the first high temperature coil 123 is omitted and does not preheat the process gas stream PR.

Like the steam cracking furnace units 1300 and 1400 as shown in FIGS. 6 and 7, also the steam cracking furnace unit 1500 as shown in FIG. 8 may particularly be operated with liquid feedstock. The preheating duty in liquid feed furnaces is relatively much larger than in gas fed furnaces, due to the additional vaporization enthalpy of the feed hydrocarbons HC. Moreover, as mentioned before, less heat can be recovered in multi-stream exchangers in the quench section (avoidance of heavy condensates). At the same time, to reduce fuel gas FU consumption and flue gas FG emissions, it is of interest to maximize the combustion air CA preheating.

As the steam cracking furnace units 1300 and 1400, the steam cracking furnace unit 1500 further includes an additional process steam superheater bundle 127, in which process steam PS is superheated against flue gas before being mixed with the hydrocarbon feed stream HC to form the process stream PR.

The secondary quench exchanger 22 is therefore, in the steam cracking furnace unit 1500 as shown in FIG. 8, provided as a feed-effluent exchanger preheating the process gas stream PR. The invention proposes a preferred positioning of this feed-effluent exchanger to be located downstream along the trajectory or flow path of the cracked gas stream PE of an additional water-boiling primary quench exchanger 21, which allows very high heat transfer coefficients and hence fast and effective cracked gas quenching.

Figure 17:
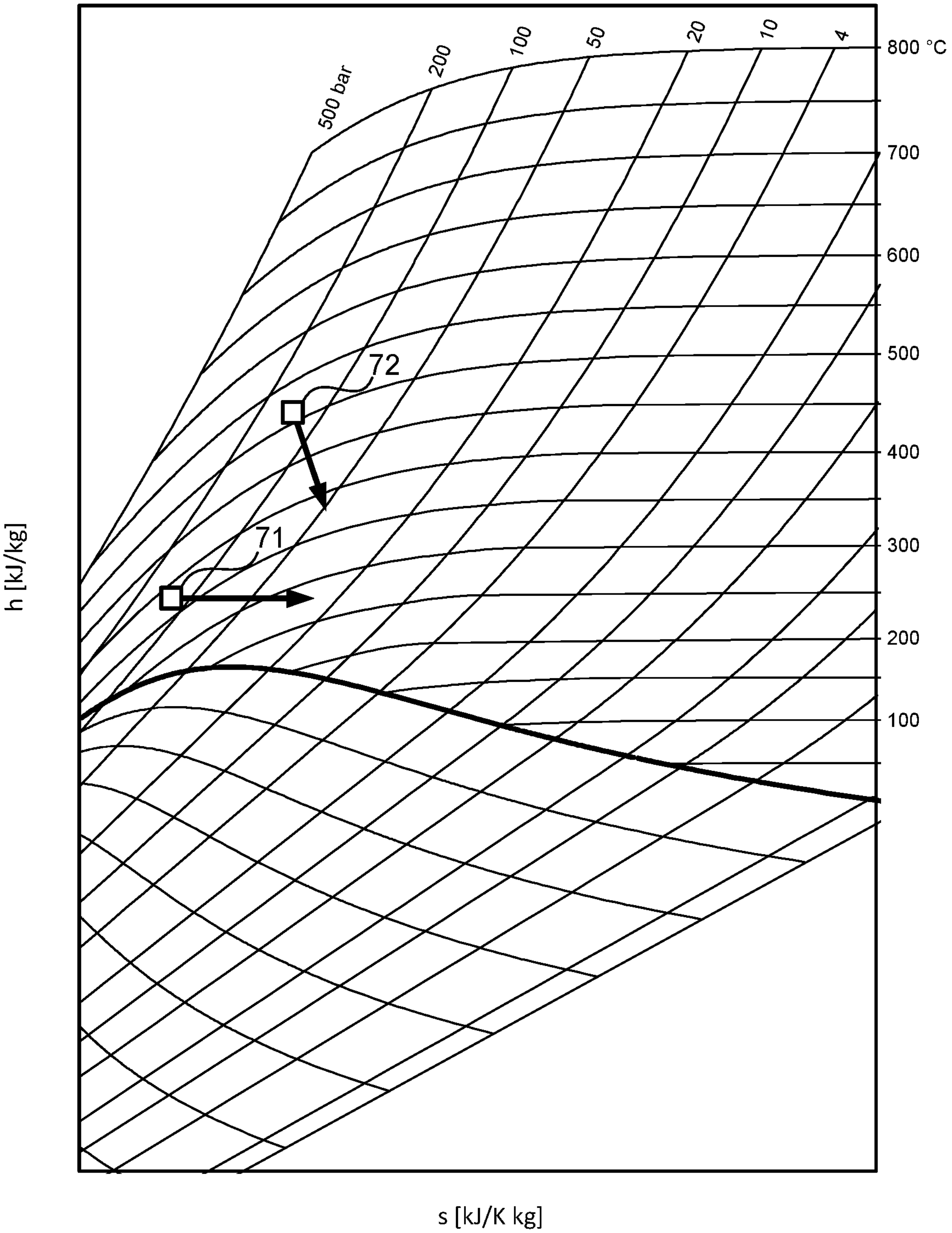
FIGS. 17 to 19 illustrate advantages of embodiments of the invention.

A particularly relevant feature of the invention and of embodiments thereof consists in limiting the level of steam superheating inside the steam cracking furnace units 1100 to 1500. As shown in FIG. 17 below, such moderate superheating is very suitable if the steam flow exported from the furnace system is solely intended for supplying process heat to consumers.

In FIG. 9, a steam cracking furnace unit 2100 according to an embodiment of the invention is illustrated. The steam cracking furnace unit 2100, such as the other steam cracking furnace units shown below, may be part of a system 100 according to an embodiment of the invention as shown before and as already mentioned, which may include a plurality of further components and whose possible system boundaries are very schematically illustrated in FIGS. 4 and 9 only.

The steam cracking furnace unit 2100 includes using an electric steam cracking furnace 210, as generally described before, including an "electric coilbox" as explained above. No convection zone is present.

Process steam PS, particularly at a temperature level of about 185° C. is mixed in a mixing nozzle M with a stream of feed hydrocarbons HC which is preheated in a heat exchanger X1. A process stream PR thus formed is further heated in a heat exchanger X2 to a temperature level of particularly about 300° C. The heat exchangers X1 and X2 can also be combined, particularly if the process steam PS is added upstream of the heat exchanger X1.

Four quench exchangers 21, 22, 22*a* and 23 are arranged in series in a process gas pathway downstream of the electric steam cracking furnace 210, forming a quench cooling train 20 of the steam cracking furnace unit 2100. As mentioned, and for reference purposes only, the first and second quench exchangers 21, 22 in this series may be the primary and secondary quench exchangers described before. The last quench exchanger 23 in the series may also be referred to as a tertiary quench exchanger and the second last quench exchanger 22*a* in the series as an intermediate quench exchanger. Alternatively, the quench exchanger 21 and the quench exchanger 22*a* may both be referred to as secondary quench exchangers.

The process stream PR is, before being additionally heated in an electric heater E1 to a temperature level of particularly about 660° C. and supplied to the electric steam cracking furnace 210 as a feed stream, preheated in the quench exchanger 22. The process stream is, as a cracked gas, and now indicated PE for clarity, withdrawn from the cracking furnace 210 and passed through the quench exchangers 21, 22, 22*a* and 23. The process stream PE effluent from the electric steam cracking furnace 210 is withdrawn from the electric steam cracking furnace 210 at a temperature level of particularly about 840° C., from the quench exchanger 21 at a temperature level of particularly about 550° C., from the quench exchanger 22*a* at a temperature level of particularly about 340° C. and from the quench exchanger 23 at a temperature level of particularly about 200° C.

Thereafter the process stream PE may be, as only shown in FIG. 9, subjected to any type of processing which includes, according to an embodiment of the invention, compression in a compressor 60, particularly a process gas compressor, which is driven by an electric motor M. Such a compressor 60 or an arrangement of compressors may also be used to compress a process stream from at least a further cracking furnace unit 1000 or 2000. As to further details, reference is made to the explanations above. Particularly a separation train is provided in which all or essentially all compressors are driven electrically.

A steam generation arrangement 30 is provided and includes a steam drum 31 and other components used in generating steam. Generally, if throughout the description, reference is made to a component belonging to one arrangement or group of components primary described with a certain function, this does not exclude that this component is not also part of a different arrangement or group of components having an additional or different function, as typical for a plant comprising interconnected parts. For example, the quench exchanger 21, the quench exchanger 22 and the quench exchanger 23 are described here as being part of the cooling train 20, but they may also be integrated into the steam generation arrangement 30.

Boiler feed water BF, as also illustrated with dotted arrows, is heated in a heat exchanger X3 to a temperature level of particularly about 180° C. and in the quench exchanger 23 to a temperature level of particularly about 290° C. before being supplied to the steam drum 31 from which a stream of boiler feed water BF is also passed to the quench exchanger 21 to be evaporated. Saturated steam SS, as also illustrated with dashed arrows, which is formed in the steam drum and which may be provided at a temperature level of particularly about 325° C. and a pressure level of particularly about 122 bar absolute pressure, may in part be used to operate the heat exchangers X2, X3 and X1 wherein in the heat exchanger X2 a condensate CO is formed which is subcooled in the heat exchangers X3 and X1.

A remaining part of the saturated steam SS is superheated in the quench exchanger 22*a*, forming (moderately) superheated high pressure steam SU, as also illustrated with dash-dotted arrows. Parameters of the superheated high pressure steam SU have been extensively described before. In the embodiment shown, this may have a temperature of about 375° C. and an absolute pressure of about 121 bar. In a steam utilization arrangement, which is denoted 50 for reference purposes only, the superheated high pressure steam SU is used for heating purposes but preferably not substantially for driving rotary equipment. Herein, the superheated high pressure steam SU is adiabatically and isenthalpically expanded using expansion units 51, 52, 53, forming high pressure steam HP, medium pressure steam MP and low pressure steam LP which is supplied to heat consumers 54, 55, 56. Steam (high-pressure or super-high-pressure steam) exported from all furnaces may be collected in a corresponding steam header, i.e. a large-volume piping system which distributes the steam over the plant to the different consumers. The supply connection to the lower pressure steam headers is made from this highest pressure header. In conventional plants, such a steam header is operated at approx. constant pressure (for operation of the turbines), which is slightly below the steam export pressure at the furnace outlet. According to embodiments of the invention, the pressure level of the highest pressure steam header can be varied more extensively, to achieve an advantageous buffer effect.

Summarizing the explanations to FIG. 9 and the steam cracking furnace unit 2100 shown, the process gas PE is in a first step (in the quench exchanger 21) rapidly and effectively cooled against vaporizing boiler feed water BF, similarly to the state-of-the-art in fired furnaces. In a second step (in the quench exchanger 22), the process gas PE is cooled in a feed-effluent exchanger against the process gas PR which is preheated before being fed to the electric cracking furnace 11. In the embodiment shown in FIG. 9, a quench exchanger 22*a* can be provided to cool down the process gas PE while moderately superheating a portion of the saturated steam SS generated in the quench exchanger 21.

Figure 10:
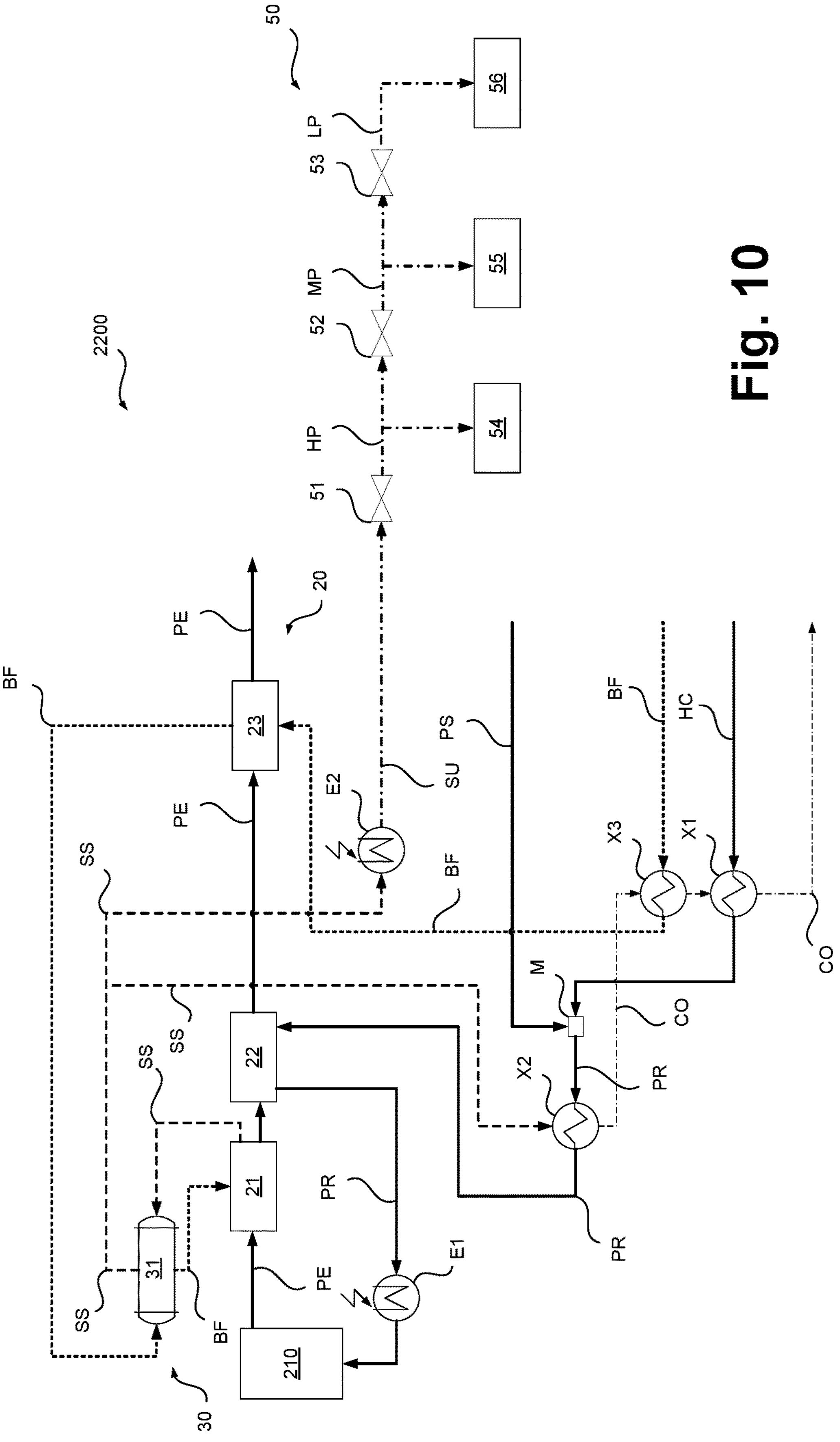

In FIG. 10, a further steam cracking furnace unit 2200 according to an embodiment of the invention is illustrated. Generally, the explanations relating to the steam cracking furnace unit 2100 according to FIG. 9 likewise apply to the steam cracking furnace unit 2200 according to FIG. 10 and only differences will be explained below.

In the steam cracking furnace unit 2200 according to FIG. 10, the quench exchanger 22*a* is omitted and an electric steam superheater E2 is provided instead. The process gas PE is withdrawn here from the quench exchanger 22 at a temperature level of particularly about 340° C.

Figure 11:
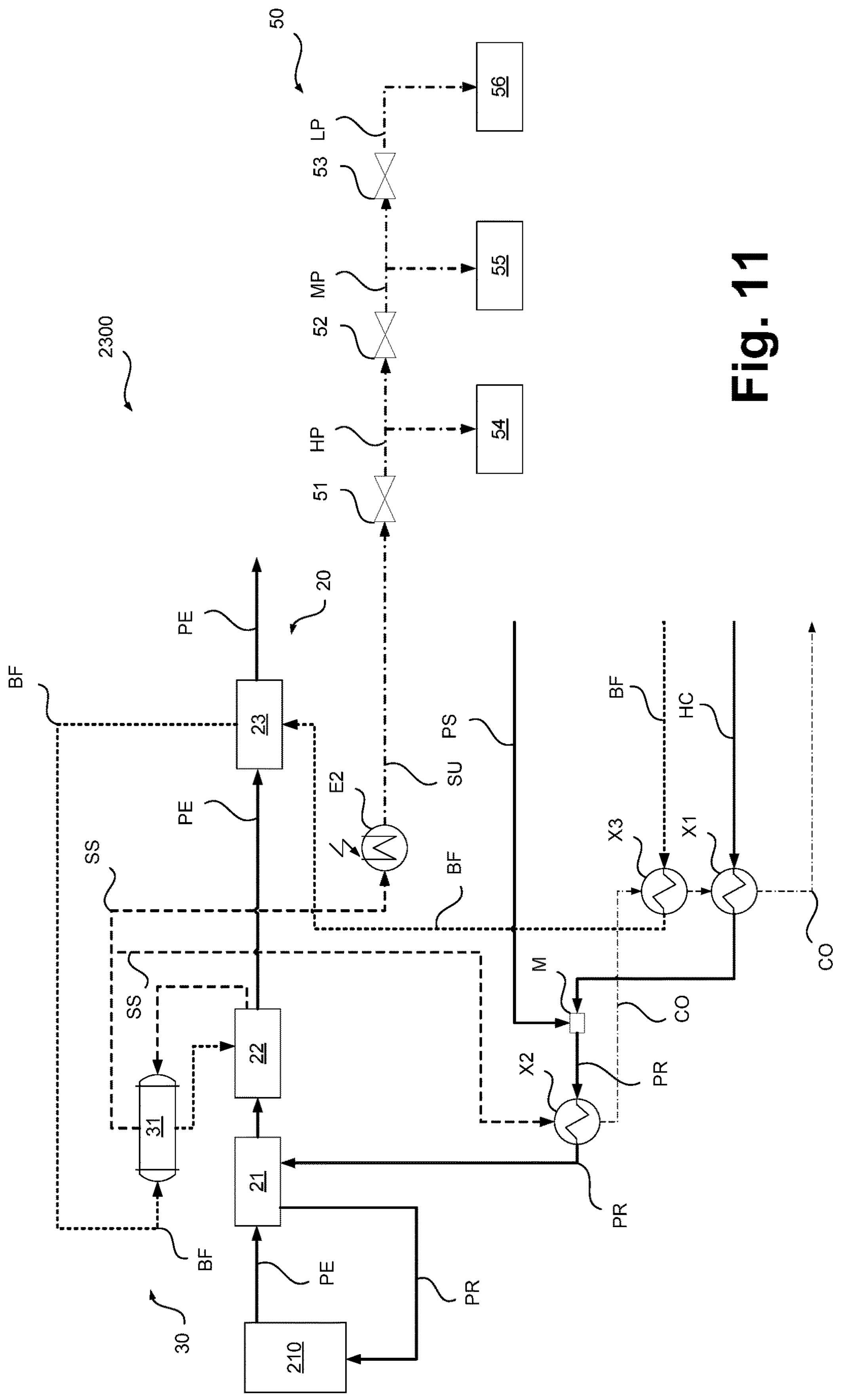

In FIG. 11, a further steam cracking furnace unit 2300 according to an embodiment of the invention is illustrated. Generally, the explanations relating to the steam cracking furnace unit 2200 according to FIG. 10, based on the explanations for the steam cracking furnace unit 2100 according to FIG. 9 apply to the steam cracking furnace unit 2300 according to FIG. 11 and only differences will be explained below.

In the steam cracking furnace unit 2300 according to FIG. 11, again no quench exchanger 22*a* is present and an electric steam superheater E2 is provided instead. In the steam cracking furnace unit 2300 according to FIG. 11, also the electric heater E1 is omitted. Furthermore, the process gas stream PR heated in the heat exchanger X2 is further heated in the quench exchanger 21 and the steam drum 31 is connected with the quench exchanger 22.

The process gas PE effluent from the electric steam cracking furnace 210 is withdrawn from the quench exchanger 22 at a temperature level of particularly about 340° C. The process stream PE is withdrawn from the quench exchanger 21 at a temperature level of particularly about 525° C.

In the embodiment shown in FIG. 11, therefore, the first two quenching steps are inverted, meaning that the effluent process gas PE is first cooled against the feed process gas PR to be preheated, and then against evaporating boiler feed water BF. In such an embodiment there is no need for an electric feed preheater, as sufficiently high preheating temperatures can be reached in the quench exchanger 21. The high pressure steam to be exported is again moderately superheated, wherein both variants from FIG. 9 and FIG. 10 can be used for superheating the steam.

All three embodiments shown in FIGS. 9 to 11 are specifically designed for electric cracking furnaces 210 operating with light (gaseous) feedstocks, most preferably consisting mostly of ethane. Therefore, all these embodiments feature a quench exchanger 23 which, in accordance with today's industrial practice, further cools the cracked gas to temperature levels down to 200° C. while particularly preheating the boiler feed water fed to the steam drum 31.

Moreover, the initial preheating (at temperature levels below 300° C.) of hydrocarbon feed HC and process steam PS after mixing to form the process stream is done by using saturated steam in the heat exchanger X2. The resulting high-pressure condensate CO can further be used in other preheating steps mentioned.

Figure 12:
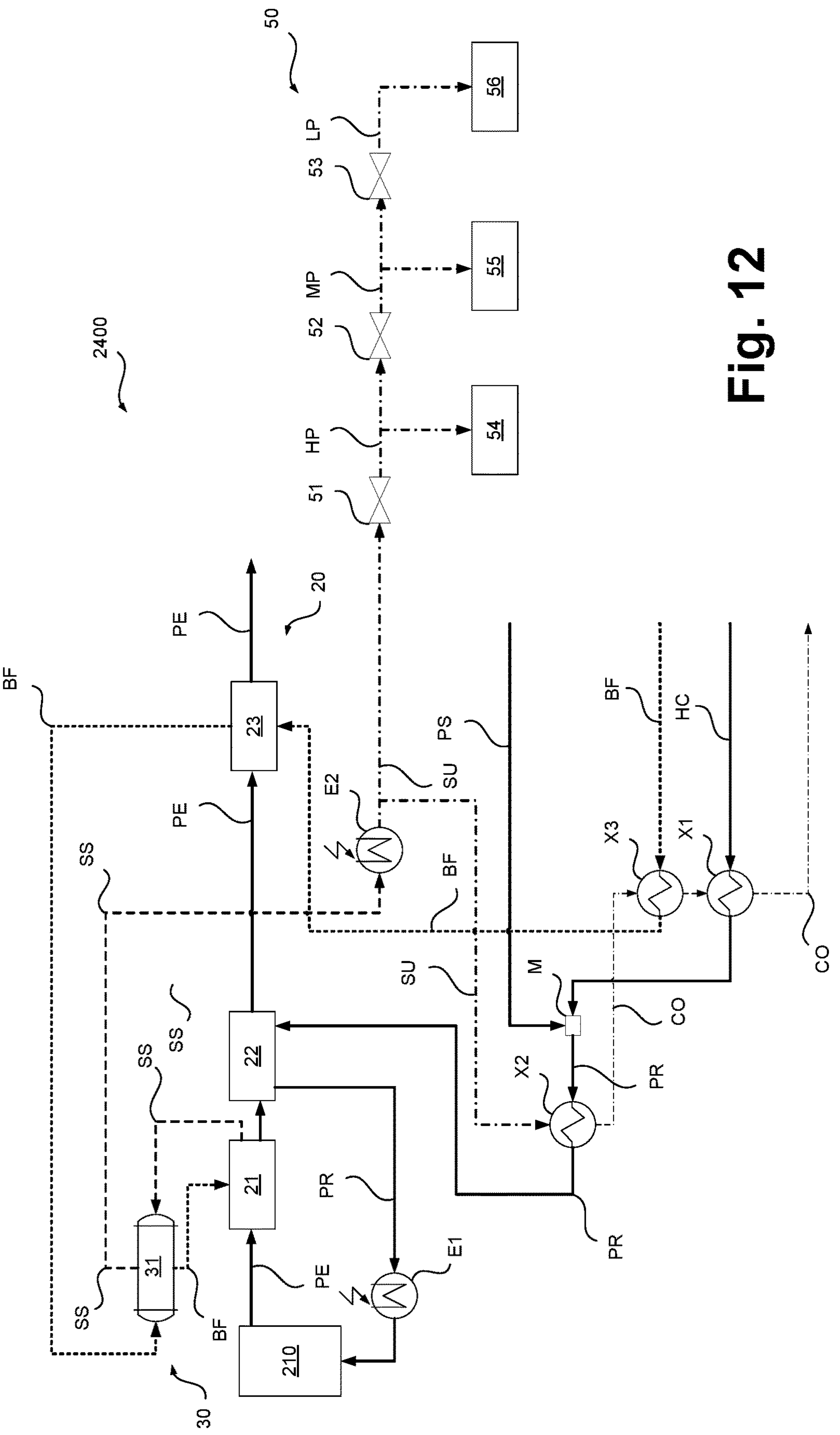

In FIG. 12, a further steam cracking furnace unit 2400 according to an embodiment of the present invention is illustrated. Generally, the explanations relating to the steam cracking furnace unit 2200 according to FIG. 10, based on the explanations for the steam cracking furnace unit 2100 according to FIG. 9 apply to the steam cracking furnace unit 2400 according to FIG. 12 and only differences will be explained below.

In the steam cracking furnace unit 2400 according to FIG. 12, again no quench exchanger 22*a* is present and an electric steam superheater E2 is provided instead. Instead of a part of the saturated steam SS, a part of the superheated steam SU is now provided to the heat exchanger X3. The process stream PR may therefore particularly be heated in the heat exchanger X2 to a temperature level of particularly about 330° C. such that less heat is withdrawn in the quench exchanger 22 and the process stream PE effluent cooled therein is withdrawn therefrom at a temperature level of particularly 370° C.

The embodiment of FIG. 12 particularly illustrates that alternatively to the embodiments shown before moderately superheated steam SU can also be used for securing the initial preheating of the hydrocarbon feed HC and process steam PS after forming the process stream PR.

Figure 13:
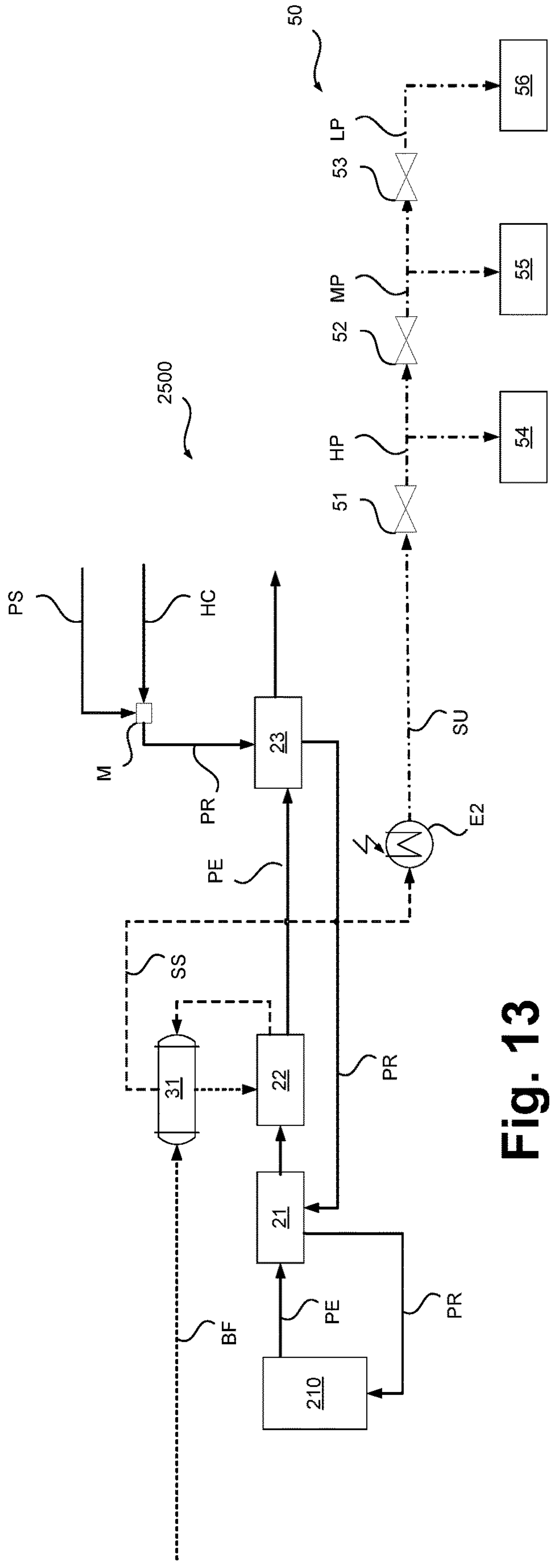

In FIG. 13, a further steam cracking furnace unit 2500 according to an embodiment of the invention is illustrated. Generally, the explanations relating to the main components of the steam cracking furnace unit 2100 according to FIG. 9 apply to the steam cracking furnace unit 2500 according to FIG. 13 as well but a number of differences are present and will be explained below.

In the steam cracking furnace unit 2500 according to FIG. 13, process steam PS at a temperature level of particularly about 185° C. is mixed in a mixing nozzle M with feed hydrocarbons HC, as above, to form a process stream PR at a temperature level of particularly about 120° C. The process stream PR is further heated in the quench exchanger 23 to a temperature level of particularly about 280° C. and in the quench exchanger 21, as before, to a temperature level of particularly about 660° C. before being supplied to the electric steam cracking furnace 210. The process gas PE effluent is withdrawn from the electric steam cracking furnace 210 at a temperature level of particularly about 840° C., from the quench exchanger 21 at a temperature level of particularly about 510° C., from the quench exchanger 22 (no further quench exchanger 22*a* is present) at a temperature level of particularly about 340° C. and from the quench exchanger 23 at a temperature level of particularly about 200° C.

Boiler feed water BF is provided to the steam drum 31 which is connected with the quench exchanger 22. Saturated steam SS may be generated at a pressure level of about 122 bar absolute pressure and at a temperature level of about 325° C. This is superheated, forming superheated steam SU with the parameters given above, in an electric heater E2.

The embodiment shown in FIG. 13 includes a further option for securing the initial preheating of the hydrocarbon feed HC and process steam PS after forming the process stream PR, where the quench exchanger 23 is designed as a feed-effluent exchanger. This possibility can be also combined with embodiments such as for example shown in FIGS. 9, 10 and 12.

Figure 14:
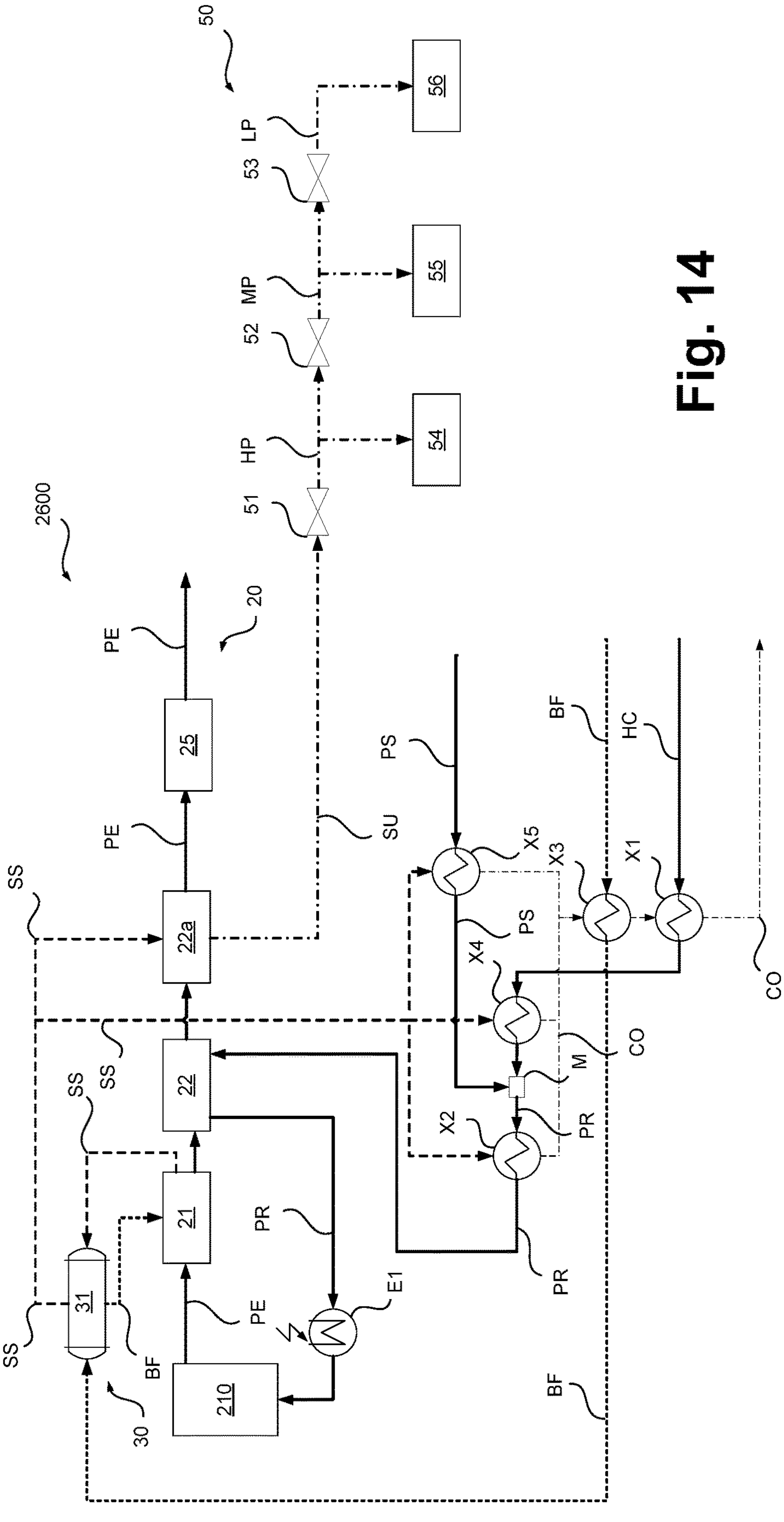

In FIG. 14, a further steam cracking furnace unit 2600 according to an embodiment of the invention is illustrated. Generally, the explanations relating to the steam cracking furnace unit 2200 according to FIG. 10, based on the explanations for the steam cracking furnace unit 2100 according to FIG. 9 apply to the steam cracking furnace unit 2600 according to FIG. 14 and only differences will be explained below.

In the steam cracking furnace unit 2600 according to FIG. 14, no quench exchanger 23 is present and an oil quench 25 is used instead. Boiler feed water BF is therefore heated in heat exchanger X3 only, particularly to a temperature level of about 260° C., before being passed to the steam drum 31. A further heat exchanger X4 is provided, heating the feed hydrocarbons further before being mixed with the process steam PS in the mixing nozzle M. The process steam PS is likewise, in a further heat exchanger X5, heated before. The heat exchangers X2, X4 and X5 are operated with saturated steam SS and condensate streams are collected before being, as described before, used in the heat exchangers X1 and X3.

In the steam cracking furnace unit 2600 according to FIG. 14, process steam PS is initially provided at a temperature level of particularly about 180° C. The temperature level of the process stream PR downstream of the heat exchanger X2 is particularly about 300° C. Heating in the electric heater E1 is particularly performed to a temperature level of about 630° C. The process gas PE effluent is withdrawn from the electric cracking furnace 210 at a temperature level of particularly about 870° C., from the quench exchanger 21 at a temperature level of particularly about 600° C., from the first quench exchanger 22 at a temperature level of particularly about 390° C., from the quench exchanger 22*a* at a temperature level of particularly about 380° C. and from the oil quench 25 at a further suitable temperature level. The saturated steam generated in the steam drum 21 is provided at a pressure level of particularly about 122 bar absolute pressure and at a temperature level of particularly about 325° C. The superheated high pressure steam SU downstream of the quench exchanger 22*a* is provided at a pressure level of particularly about 121 bar absolute pressure and at a temperature level of particularly about 380° C.

Figure 15:
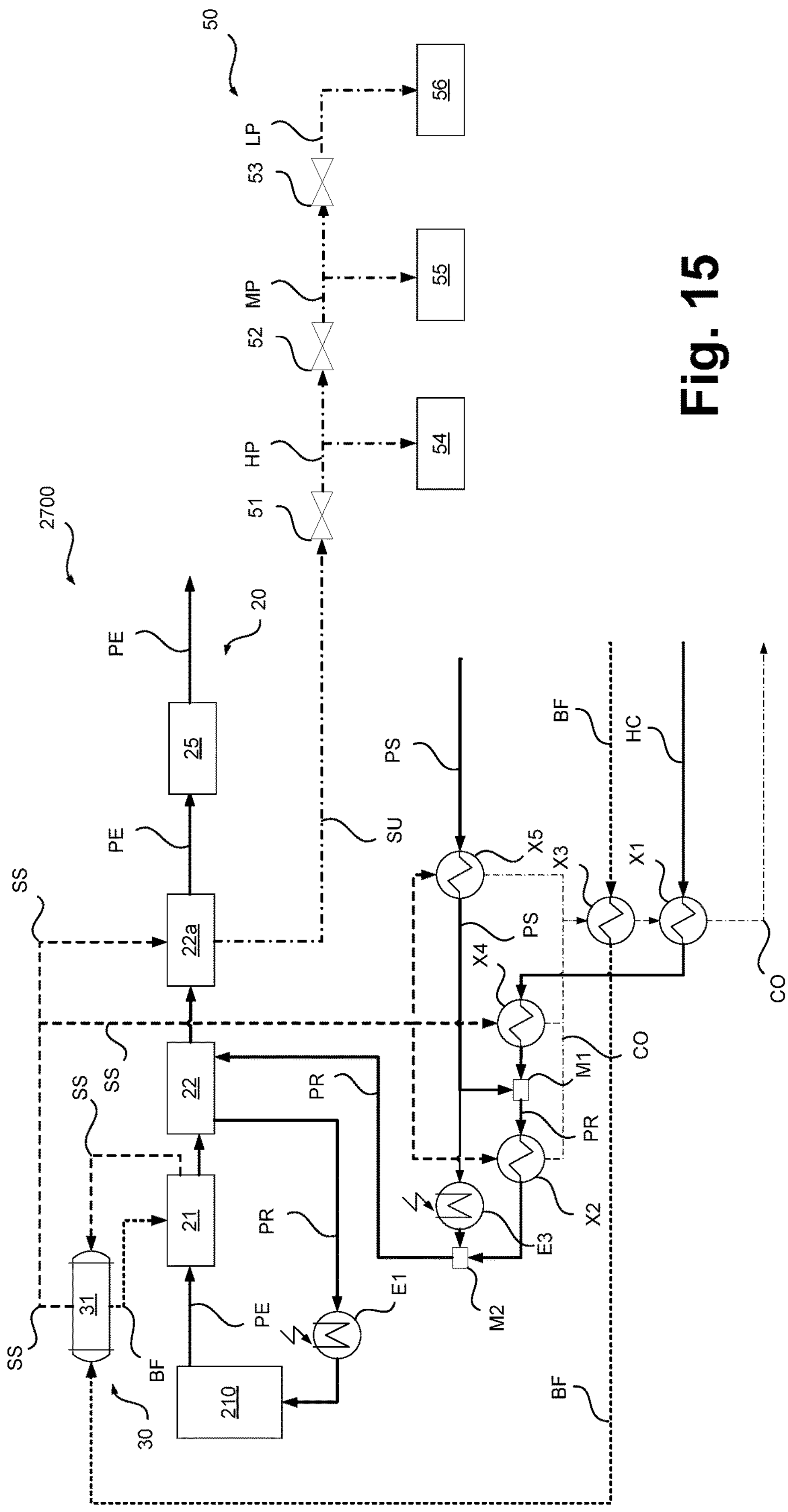

In FIG. 15, a further steam cracking furnace unit 2700 according to an embodiment of the invention is illustrated. Generally, the explanations relating to the steam cracking furnace unit 2600 according to FIG. 14, based on the explanations for the steam cracking furnace unit 2100 according to FIG. 9 apply to the steam cracking furnace unit 2700 according to FIG. 15 and only differences will be explained below.

In the steam cracking furnace unit 2700 according to FIG. 15, process steam PS is successively admixed to the feed hydrocarbons HC in a first and a second mixing nozzle M1, M2, where the process steam PS admixed in the second mixing nozzle M2 is further heated in a further electric heater E3.

As alternative process variants, FIGS. 14 and 15 show exemplary embodiments of the invention as applied for an electric furnace 210 operating on liquid feedstock and heavy liquid feedstock, respectively. In such embodiments, there is no quench exchanger 23, analogously to fired liquid feedstock furnaces. The feed preheating section is typically more complex, featuring e.g. additional feed preheating steps (see FIGS. 14 and 15, incl. electric process steam superheater usage for heavy liquid feedstocks) and/or one or more process steam superheating steps in multiflow heat exchangers. Nevertheless, the embodiments shown in FIGS. 14 and 15 are straightforward adaptations of the embodiment shown in FIG. 9. Consequently, the variants presented by the embodiments shown in FIGS. 10 to 12 can analogously be applied to liquid feed furnaces as shown in FIGS. 14 and 15, as they were applied to the gas feed furnace of FIG. 9.

Figure 16:
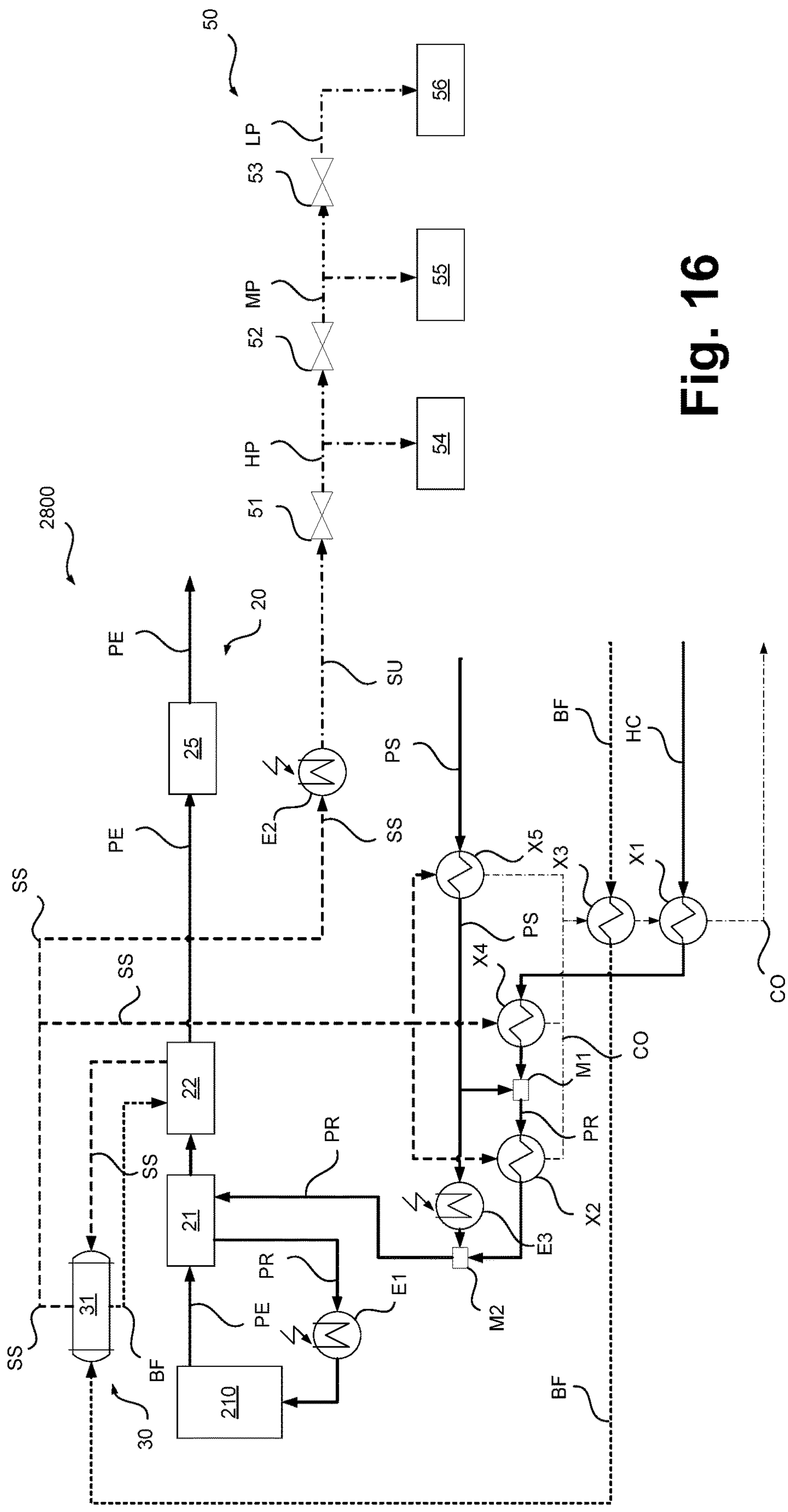

In FIG. 16, a further steam cracking furnace unit 2800 according to an embodiment of the invention is illustrated. Generally, the explanations relating to the steam cracking furnace unit 2700 according to FIG. 15, based on the explanations for the steam cracking furnace unit 2100 according to FIG. 9 apply to the steam cracking furnace unit 2800 according to FIG. 16 and only differences will be explained below.

Similar to the steam cracking furnace unit 2200 according to FIG. 10 again, the quench exchanger 22*a* is omitted and an electric steam superheater E2 is provided instead. As an exemplary variant, FIG. 16 shows a process variant for a heavy liquid feed furnace analogous to the gas feed variant shown in FIG. 11 (with the quench exchanger 21 designed as feed-effluent exchanger).

In FIG. 17, a Mollier (enthalpy/entropy) diagram with an entropy s in kJ/(K*kg) displayed on the horizontal axis and an enthalpy h in kJ/kg displayed on the vertical axis is shown for water. With a point 71, a moderate superheating as used according to embodiments of the invention is indicated while with a point 72, a high superheating as used according to the prior art is indicated. An adiabatic or isenthalpic expansion performed according to the invention and embodiments thereof, characteristic of a state change in valves or reducers when the steam is intended to be used for heating purposes only, is displayed with an arrow starting from point 71 while a polytropic expansion performed according to the prior art and not according to the invention, characteristic of a state change in steam turbines when the steam is intended to be first used for mechanical purposes prior to its use for heating purposes, is displayed with an arrow starting from point 72.

Figure 18:
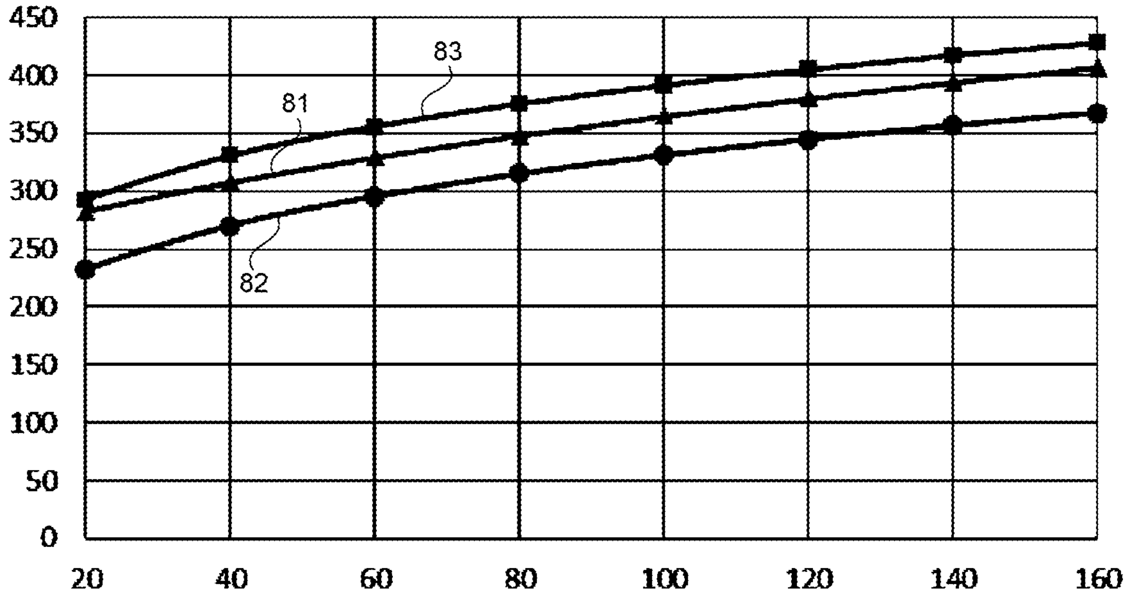

According to the invention, by mere isenthalpic expansion, the pressure can be reduced without phase change to the pressure and temperature levels required by the heat consumer. An exemplary temperature evolution curve 81 of such an isenthalpic state change (featuring a supporting point at 380° C. and 120 bar absolute pressure) is shown in FIG. 18 for a pressure range between 20 and 160 bar absolute pressure, altogether with corresponding most preferred curve envelopes 82 and 83 (with +20 K and +80 K dew point margins). In FIG. 18, an absolute pressure in bar is indicated on the horizontal axis and a temperature in ° C. is indicated on the vertical axis.

Figure 19:
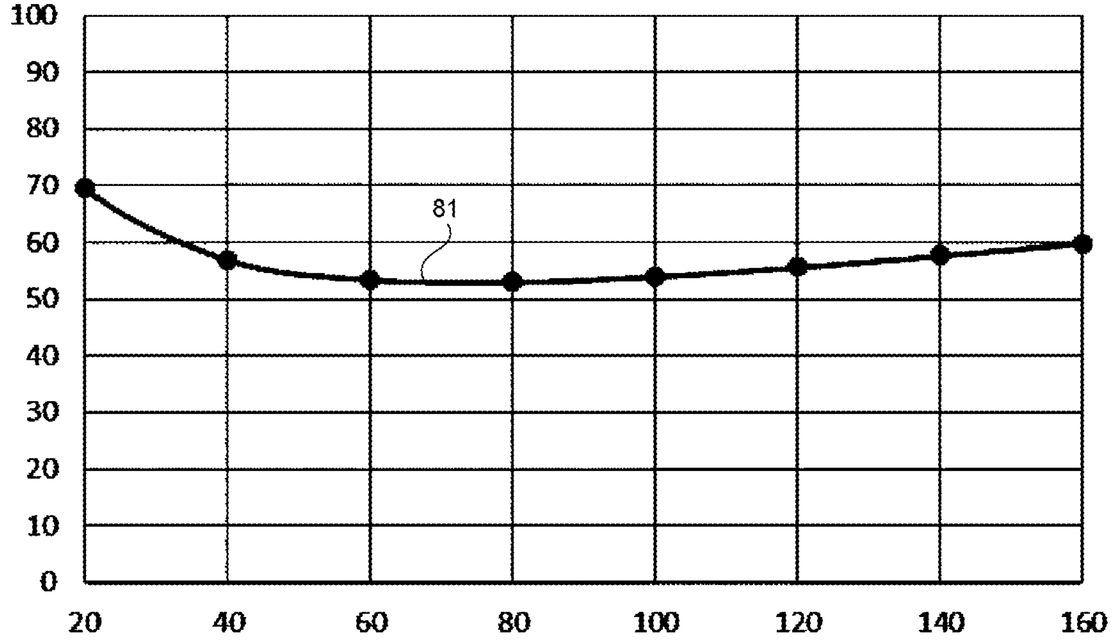

The corresponding dew point margin for the same exemplary isenthalpic curve 81 is shown in FIG. 19 for the same pressure range. In FIG. 19, again an absolute pressure in bar is indicated on the horizontal axis while temperature difference values in K are indicated on the vertical axis.

FIG. 20 illustrates a further fired steam cracking furnace unit usable in a hybrid concept of the invention as shown in FIG. 3.

As to the components of the fired steam cracking furnace unit according to FIG. 20, which is denoted 1600, reference is made to the explanations relating to FIGS. 4 to 8, particularly FIG. 5. Essential aspects of the embodiment shown in FIG. 20 include a two-step combustion air preheating to a temperature level of about 610° C., a feed HC preheating before and after combination with process steam PS in the terminal quench cooling heat exchangers 22 and 23, no boiler feed preheating, use of only three heat exchanger bundles 124, 125 and 126 in the convection section, and a flue gas exhaust temperature of about 110° C.

The invention claimed is:

1. A method of steam cracking, comprising:

providing a steam cracking system including:

a first steam cracking furnace unit or a plurality of first steam cracking furnace units, the first steam cracking furnace unit or each of the plurality of first steam cracking furnace units comprising one or more fired steam cracking furnaces;

a second steam cracking furnace unit or a plurality of second steam cracking furnace units, the second steam cracking furnace unit or each of the plurality of second steam cracking furnace units comprising one or more electric steam cracking furnaces; and means for preheating at least a part of combustion air provided to the one or more fired steam cracking furnaces of the first steam cracking furnace unit or the plurality of first steam cracking furnace units to a temperature level of at least 100° C.;

feeding a hydrocarbon feed to the first steam cracking furnace unit or the plurality of first steam cracking furnace units and to the second steam cracking furnace unit or the plurality of second steam cracking furnace units:

preheating the at least a part of combustion air provided to the one or more fired steam cracking furnaces to the temperature level of at least 100° C.; and steam cracking the hydrocarbon feed in the one or more fired steam cracking furnaces and in the one or more electric steam cracking furnaces.

2. The method according to claim 1, wherein, in the first steam cracking furnace unit or each of the plurality of first steam cracking furnace units and in the second steam cracking furnace unit or each of the plurality of second steam cracking furnace units, the steam cracking furnace or furnaces is or are coupled to at least one quench cooling train in thermal association with at least one steam generation arrangement in which at least superheated high pressure steam at a first pressure level between 30 and 175 bar absolute pressure and at a first temperature level and no steam at a higher temperature level than the first temperature level is generated, the superheated high pressure steam at the first pressure level being at least in part adiabatically and isenthalpically expanded to a second pressure level below the first pressure level such that its temperature level is lowered to a second temperature level, and the first temperature level being selected such that each intermediate temperature level reached at intermediate pressure levels of more than 20 bar during the adiabatic and isenthalpic expansion is between 5 and 120 K above the dew point of steam at the respective intermediate pressure level during the adiabatic and isenthalpic expansion.

3. The method according to claim 2, wherein the superheated high pressure steam at the first pressure level and at the first temperature level does not include steam generated from process water and/or only includes steam generated from boiler feed water, such that the superheated high pressure steam at the first pressure level and at the first temperature level is provided as high-purity superheated high pressure steam.

4. The method according to claim 2, wherein one or more process streams, before being passed through one or more cracking furnace coilboxes of the cracking furnace(s) of the first and/or second cracking furnace unit(s), or feed hydrocarbons and/or process steam used in generating the at least one process stream, or combustion air, is at least in part heated using heat withdrawn from at least one of the process streams downstream of said coilbox(es).

5. The method according to claim 4, wherein said heat withdrawn from the one or more process streams downstream of said coilbox(es) is at least in part withdrawn from the at least one process stream downstream of said coilbox(es) in one or more direct feed-effluent heat exchangers.

6. The method according to claim 4, wherein said heat withdrawn from the one or more process streams downstream of said coilbox(es) is at least in part transferred to steam which is thereafter used in heating the at least one process stream, or to feed hydrocarbons and/or the process steam used in generating the at least one or more process streams, or to combustion air.

7. The method according to claim 6, wherein said means for preheating at least a part of the combustion air preheats the combustion air to a temperature level of up to 1000° C., and wherein the combustion air preheating temperature is varied during operation.

8. The method according to claim 7, wherein the first steam cracking furnace unit(s) and the second steam cracking furnace unit(s) are operated, in different operating modes, using variable fuel gas consumption rates and electric power consumption rates, respectively, such that a variable ratio between the total fuel gas consumption and the total electric power consumption rates summed over all first and second steam cracking furnace unit(s) is achieved, while maintaining a constant total cracking product yield from the said furnace units.

9. The method according to claim 8, wherein a hydrogen-rich fuel gas is at least temporarily released from an electrolysis unit, an ammonia decomposition unit, and/or a hydrogen storage unit to supply at least temporarily needed additional fuel gas to the first steam cracking furnace unit or to at least one of the plurality of first steam cracking units and/or to supply other hydrogen consumers.

10. The method according to claim 1, wherein an at least temporary surplus of a hydrogen-rich fuel gas generated from a hydrogen separation unit, compared to the overall consumption of hydrogen in the first steam cracking furnace unit or at least one of the plurality of first steam cracking units and/or in other hydrogen consumers, is at least temporarily fed to a fuel cell unit and/or a hydrogen storage unit.

11. The method according to claim 1, wherein a fuel gas used in firing the steam cracking furnace(s) of the first steam cracking furnace unit(s) is heated to a temperature level which is varied during operation.

12. The method according to claim 11, wherein the fuel gas used in firing the steam cracking furnace(s) of the first steam cracking furnace unit(s) has a hydrogen content between 0 and 100 wt.-%.

13. The method according to claim 1, wherein one or more process streams, before being passed through one or more cracking furnace coilboxes of the cracking furnace(s) of the first and/or second cracking furnace unit(s), or feed hydrocarbons and/or process steam used in generating the at least one process stream, or combustion air, is at least in part heated using heat withdrawn from at least one of the process streams downstream of said coilbox(es).

14. The method according to claim 13, wherein said heat withdrawn from the one or more process streams downstream of said coilbox(es) is at least in part withdrawn from the at least one process stream downstream of said coilbox(es) in one or more direct feed-effluent heat exchangers.

15. The method according to claim 13, wherein said heat withdrawn from the one or more process streams downstream of said coilbox(es) is at least in part transferred to steam which is thereafter used in heating the at least one process stream, or to feed hydrocarbons and/or the process steam used in generating the at least one or more process streams, or to combustion air.

16. The method according to claim 1, wherein said means for preheating at least a part of the combustion air preheats the combustion air to a temperature level of up to 1000° C., and wherein the combustion air preheating temperature is varied during operation.

17. The method according to claim 1, wherein the first steam cracking furnace unit(s) and the second steam cracking furnace unit(s) are operated, in different operating modes, using variable fuel gas consumption rates and electric power consumption rates, respectively, such that a variable ratio between the total fuel gas consumption and the total electric power consumption rates summed over all first and second steam cracking furnace unit(s) is achieved, while maintaining a constant total cracking product yield from the said furnace units.

18. The method according to claim 1, wherein a hydrogen-rich fuel gas is at least temporarily released from an electrolysis unit, an ammonia decomposition unit, and/or a hydrogen storage unit to supply at least temporarily needed additional fuel gas to the first steam cracking furnace unit or to at least one of the plurality of first steam cracking units and/or to supply other hydrogen consumers.

19. The method according to claim 1, wherein a fuel gas used in firing the steam cracking furnace(s) of the first steam cracking furnace unit(s) has a hydrogen content between 0 and 100 wt.-%.

20. A system for performing a method of steam cracking, the system comprising:

a first steam cracking furnace unit or a plurality of first steam cracking furnace units, the first steam cracking furnace unit or each of the plurality of first steam cracking furnace units comprising:

one or more fired steam cracking furnaces; and means adapted to preheat at least a part of combustion air provided to its fired steam cracking furnace or furnaces to a temperature level of at least 100° C.; and a second steam cracking furnace unit or a plurality of second steam cracking furnace units, the second steam cracking furnace unit or each of the plurality of second steam cracking furnace units comprising one or more electric steam cracking furnaces.

* * * * *